United States Patent
Sander et al.

(10) Patent No.: US 6,762,757 B1
(45) Date of Patent: *Jul. 13, 2004

(54) USING HARDWARE DEVICES TO GENERATE MODIFIED GEOMETRY OBJECTS BASED ON INSTRUCTIONS PROVIDED BY EXTENSION OBJECTS

(75) Inventors: Nikolai Sander, Fairfax, CA (US); Norbert Alan Jeske, Berkeley, CA (US)

(73) Assignee: Autodesk, Inc., San Rafael, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 10/046,930

(22) Filed: Jan. 14, 2002

Related U.S. Application Data

(63) Continuation-in-part of application No. 09/935,180, filed on Aug. 21, 2001.
(60) Provisional application No. 60/346,240, filed on Dec. 31, 2001, provisional application No. 60/291,947, filed on May 18, 2001, and provisional application No. 60/293,109, filed on May 22, 2001.

(51) Int. Cl.[7] .............................................. G06T 17/00
(52) U.S. Cl. ....................... 345/420; 345/423; 345/606; 345/643
(58) Field of Search ............................... 345/420, 423, 345/606, 643

(56) References Cited

PUBLICATIONS

SGI—Products, entitled "OpenGL Shader Overview" dated Dec. 1, 2001, (2 pgs) http://www.sig.com/software/shader/overview.html.

GameDev.net, entitled "Shader Programming Part I: Fundamentals of Vertex Shaders", by Wolfgang Engel, dated Sep. 18, 2001, (32 pgs) http://www.gamedev.net/reference/articles/article1496.asp.

Maya, entitled "Maya Hardware Shader White Paper", ©2001, Alias|Wavefront, dated Sep., 2001, (21 pgs).

Andrew Clayton and Nancy Fulton. 3D Studio Max Applied. Advanstar Communications, 1996, pp. 313–315.

*Primary Examiner*—Mark Zimmerman
*Assistant Examiner*—Adam Arnold
(74) *Attorney, Agent, or Firm*—Moser Patterson & Sheridan LLP

(57) ABSTRACT

An approach is described for using hardware devices to generate modified geometry objects based on instructions provided by extension objects. An extension object is associated with a sequence of components, such as a modifier stack, that are used to modify a geometry object to generate an initial representation of the geometry object. Instructions that are based on the extension object are associated with the initial representation. A graphics device, such as a hardware shader, is used to generate a final representation of the geometry object based on the instructions and the initial representation. The instructions may be executed by an application program interface to provide instructions to the graphics device for generating the final representation of the geometry object. The instructions may be generated based on the extension object, and a graphics card may execute the instructions to generate the final representation of the geometry object.

62 Claims, 22 Drawing Sheets

USING HARDWARE DEVICES TO GENERATE MODIFIED GEOMETRY OBJECTS BASED ON INSTRUCTIONS PROVIDED BY EXTENSION OBJECTS

CLAIM OF PRIORITY

This application claims priority from prior U.S. Provisional Patent Application Serial No. 60/346,240, filed on Dec. 31, 2001, entitled "APPROACH FOR EXTENSION OBJECTS, PER SUBJECT OBJECTS, AND USING HARDWARE DEVICES TO MODIFY GEOMETRY OBJECTS" naming as inventors Nikolai Sander, Attila Szabo, and Norbert Alan Jeske; and this application claims priority as a continuation-in-part from prior U.S. patent application Ser. No. 09/935,180, filed on Aug. 21, 2001, entitled "IMPLEMENTING STACK EXTENSIONS IN A MODIFIER STACK" naming as inventor Nikolai Sander; which in turn claims priority from both prior U.S. Provisional Patent Application Serial No. 60/291,947, filed on May 18, 2001, entitled "CONTENT LAYOUT AND DESIGN MECHANISM" naming as inventors Nikolai Sander, Scott Morrison, Britt Miura, Kellis Elmquist, John Wainwright, Michael Malone, Frank Delise, Atilla Szabo, and Norbert Alan Jeske; and from prior U.S. Provisional Patent Application Serial No. 60/293,109, filed on May 22, 2001, entitled "A MECHANISM FOR CONTENT AND DESIGN LAYOUT," naming as inventors Nikolai Sander, Scott Morrison, Britt Miura, Kells Elmquist, John Wainwright, Michael Malone, Frank Delise, Atilla Szabo, and Norbert Alan Jeske; the entire disclosures of all the aforementioned applications are hereby incorporated by reference in their entirety for all purposes herein.

COPYRIGHT DISCLAIMER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to computer graphics, and more specifically, to using hardware devices to generate modified geometry objects based on instructions provided by extension objects.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Computer generated three dimensional (3D) modeling and animation enrich a wide range of human experiences that include everything from captivating audiences at movie theaters, to gluing gamers to their video games, to embarking home buyers on virtual tours of new homes. To generate 3D models and/or animations, a 3D designer interacts with a 3D modeling program, such 3D Studio Max™, which is commercially available from Autodesk, Inc., to define geometry objects for importing into a computer graphic application, such as a game engine. As used herein, the term "geometry object" is an object in a graphics application that is comprised of geometrical features that can be manipulated by the graphics application.

As part of creating a geometry object, the designer typically defines a base object, for example a sphere or box, and then applies one or more modifiers to the base object to create a geometry object that can then be exported into a graphic application. As used herein, the term "base object" is the first component in a series of components that are used to define and modify a geometry object.

For example, to create an object, a user, such as an animator, may interact with a conventional modeling program to define a base object by selecting a particular object type from a set of predefined object types and selecting a set of parameter values that are to be used to define the specific parameters of the base object. Next, using the modeling program, the user may define one or more modifiers or other types of components that are to be applied to the base object for modifying certain characteristics, properties, attributes, constraints, and other parameters of the base object. Thereafter, once the user is satisfied with the object that is generated based on the selected base object and modifiers, the object can then be exported for use in a graphics application. As used herein, a component defines one or more operations in the designing of a geometry object. Components may include, but are not limited to, base components that are used as the starting point in a sequence of components and modifier components that are included in the sequence of components and that modify base components.

As another example, FIG. 1A, FIG. 1B, and FIG. 1C depict a conventional modeling program interface 100 that can be used to generate an object that includes a set of desired characteristics, properties, attributes, constraints, and other parameters. As depicted in window 108 of FIG. 1A, a user may interact with modeling program interface 100 to create a base object 110 by selecting a particular type of object (for example a sphere object) from a creation panel (not shown). Once the object is created, the parameters that are associated with base object 110 can be edited using either the creation panel or through an object parameter menu 104. For example, a sequential ordering of components in the form of a stack may be used to create and modify the geometry object. In the example depicted in FIG. 1A, the components are modifiers that are organized into a modifier stack 105. A modifier stack window 106 provides a visual representation of modifier stack 105 that depicts the base object 110 and any modifiers that have been selected for modifying the base object 110.

Conventionally, the stack provides a sequential hierarchical order for applying the components in the stack to a base component. In some instances, the stack is described as being "evaluated" and each component in the stack is said to be "evaluated," meaning that the parameters associated with each component are used to define one or more actions to be taken with respect to the base component or a subsequent version of the base component, such as making modifications to the base object.

As used herein, the terminology of "applying a component" and "evaluating a component" are synonymous. Also, the term "component" includes but is not limited to modifiers that are components that alter the object. For example, components may include a base component that is the starting point for defining a geometry object in a stack or a display component that provides a representation of the object, such as by presenting a visual representation of the object to a user on a display device.

Once a base component is defined, the user may apply one or more components to modify the characteristics, properties, attributes, constraints, or other parameters of the base component. For example, in FIG. 1B, the user may select a bend modifier button 112 and enter bend parameter data in a bend parameter menu 114 to define a bend modifier for applying to base object 110. Because base object 110 has the form of a sphere, base object 110 may be referred to as a sphere object. In response to the user defining the bend modifier, the bend modifier is inserted into modifier stack 105 in modifier stack window 106. As a result of applying the bend modifier to base object 110, a sphere/bend object 116 is created as depicted in window 108 of FIG. 1B.

After applying the bend modifier, the user may apply additional modifiers to modify the characteristics, properties, attributes, constraints, or other parameters of sphere/bend object 116. For example, in FIG. 1C, the user may select a taper modifier button 118 and enter taper parameter data in a taper parameter menu 120 to define a taper modifier for applying to the sphere/bend object 116 to create a sphere/bend/taper object 122 as depicted in window 108 of FIG. 1C. In response to the user defining the taper modifier, the taper modifier is added to modifier stack 105 in modifier stack window 106 of FIG. 1C.

FIG. 1D depicts a conventional modifier stack 150 (as presented to the user as modifier stack 105 in modifier stack window 106 of FIG. 1C) that is used to render sphere/bend/taper object 122 in FIG. 1C. In this example, modifier stack 150 includes sphere object data 152, bend modifier data 154, taper modifier data 156 and a node world-space cache (wscache) data 158. Modifier stack 150 maintains a hierarchical order that is used in evaluating the components within the stack. For example, in evaluating modifier stack 150, the lower-ordered bend modifier data 154 is applied or evaluated prior to the higher-ordered taper modifier data 156. Note that if the order of bend modifier data 154 and taper modifier data 156 were switched, the resulting sphere/taper/bend object would likely have at least a somewhat different appearance than sphere/bend/taper object 122.

In the example depicted in FIG. 1D, sphere object data 152 describes the base object selected by the user. Bend modifier data 154 and taper modifier data 156 describe the modifications that are to be respectively applied as the object is passed-up the modifier stack 150. Node wscache data 158 represents the cached result of evaluating modifier stack 150 in world space coordinates instead of object space coordinates.

In evaluating modifier stack 150, a geometry type is selected for rendering the particular object. Assume for the example of FIG. 1D that a geometry type of mesh is selected for rendering the object when sphere object data 152 is defined. To render the object, an initial mesh object is first generated based on the characteristics, properties, attributes, constraints, and other parameters that were defined in sphere object data 152 (for example, base object 110 in FIG. 1A). Next, the mesh object is passed up the modifier stack 150 and bend modifier data 154 is applied to a copy of the initial mesh object to create an updated mesh object (for example, sphere/bend object 116). Next, the updated mesh object is passed up the modifier stack 150 and taper modifier data 156 is applied to a copy of the updated mesh object to further update the mesh object (for example, sphere/bend/taper object 122). Finally, the updated mesh object is passed up the modifier stack 150 to the node wscache data 158 that causes the object (sphere/bend/taper object 122) to be rendered in window 108 as depicted in FIG. 1C.

Using a stack for modeling geometry objects is generally referred to as non-destructive modeling in that each component in the stack is reapplied or reevaluated in their specific order whenever a change is made to an object or a component within the stack. For example, if the user redefines the dimensions of the "lower-ordered" sphere object data 152, "higher-ordered" bend modifier data 154 and taper modifier data 156 are sequentially reapplied to the newly defined mesh object prior to the resulting geometry object being displayed to the user by the node wscache data 158.

Additional examples of how modifier stacks may be used to render 3D objects are provided in U.S. Pat. No. 6,061,067, entitled APPLYING MODIFIERS TO OBJECTS BASED ON THE TYPES OF THE OBJECTS; U.S. Pat. No. 6,195,098, entitled SYSTEM AND METHOD FOR INTERACTIVE RENDERING OF THREE DIMENSIONAL OBJECTS; U.S. Pat. No. 5,995,107, entitled CACHING IN A THREE DIMENSIONAL MODELING AND ANIMATION SYSTEM; U.S. Pat. No. 6,034,695 entitled THREE DIMENSIONAL MODELING AND ANIMATION SYSTEM; U.S. Pat. No. 6,184,901 entitled THREE DIMENSIONAL MODELING AND ANIMATION SYSTEM; and U.S. patent application Ser. No. 09/286,133 entitled TRANSLATING OBJECTS BETWEEN SOFTWARE APPLICATIONS WHICH EMPLOY DIFFERENT DATA FORMATS.

A drawback with using a conventional stack to render a geometry object is that certain characteristics, properties, attributes, constraints, and other parameters that were defined at a lower level in the stack no longer influence, or may not even make sense, at a higher level in the stack. For example, sphere object data 152 may include a constraint that no face on the created mesh object is to be smaller than a specified size. Thus, when creating the initial mesh object based on sphere object data 152, the constraint guarantees that the initial mesh object will be created without any faces that are smaller than the specified size.

However, once the initial mesh object is created, the size constraint that is defined by sphere object data 152 is lost and thus is no longer active. When the copy of the initial mesh object is updated based on the bend modifier data 154, the constraint information that was defined by sphere object data 152 no longer influences how the mesh object is modified. Thus, the updated mesh object that is created from applying the bend modifier data 154 may now include one or more faces that are smaller than the specified size. In order to reapply the size constraint, another modifier that applies and enforces the size constraint may be inserted into the stack. However, if many different modifiers are included in the stack, the user may have to repeatedly add such size constraint modifiers, which is inconvenient and adds to the size and complexity of the stack.

In addition, certain properties of a geometry object, such as the number of faces that are contained within a mesh representation of the geometry object, may dynamically change as the geometry object is passed up the stack. For example, attributes may be applied at a lower level to specific faces of the mesh object. If the faces are later removed and/or combined with other faces at a higher level in the modifier stack, the stack may not be able to adequately handle the applied attributes. For example, the base object data may specify that a friction value of "10" is to be associated with face "100" while a friction value of "4" is to be associated with face "101." However, if in passing the initial mesh object up the stack a subsequent modifier causes faces "100" and "101" to be combined into a single face, the stack may not know what friction value, or even if a friction value, is to be associated with the single combined face of the updated mesh object.

A recent trend in 3D computer graphics is the use of "hardware shaders" that use graphics hardware to perform some graphics manipulations that were previously performed by graphics software. For computationally intensive graphical operations, such as morphs and skin effects, there is a significant increase in performance when such graphical operations are performed by hardware instead of software. Examples of hardware shaders include the ATI Radeon, ATI Radeon 8500, and Leadtek Geforce3 graphics cards. Current hardware shaders are capable of performing only certain types of graphical operations, such as per vertex operations, in which the locations of the vertexes of objects are manipulated and processed for lighting calculations, and per pixel operations, in which colors are interpolated and texturing effects are applied for producing the pixels that are shown on a display.

An application program interface (API) allows users to provide instructions to the hardware shaders on how to render graphics on a display. For example, users can use Microsoft's DirectX Graphics API, which includes Direct3D, or SGI's OpenGL API, to provide instructions to the hardware shaders. The API specifies how users are to supply instructions to the hardware shaders, and the types of instructions that are to be supported by the hardware shaders. Essentially, the API allows for the programming of the graphics hardware.

FIG. 10 depicts a flow diagram of the operation of a conventional hardware shader. In block 1010, 3D data is received, such as the data that defines a geometry object that is received from a 3D modeling application. In block 1020, the per vertex operations are performed, such as transformation and lighting effects. In block 1030, the image is rasterized, meaning that the triangles used to represent the geometry object or objects are set up. In block 1040, per pixel operations are performed, which can include applying texturing effects. Finally, in block 1050, the image is displayed, such as by using a FrameBuffer. The API's for the hardware shaders allow a user to not just tweak or change the parameters used in per vertex and per pixel operations, but to define the underlying equations used for such operations.

Conventionally, an end user accesses the capabilities of the API and the hardware shader by using another program, sometimes referred to as a "shader tool," such as the nVidia Effects Browser. Thus, the user can in essence program the hardware shader to apply specified vertex and pixel operations to the 3D output of a graphics modeling application. However, the need to use an additional shader tool is cumbersome and inconvenient for graphics designers and may outweigh the performance improvements that would result from having the graphics hardware perform the specified graphic operations instead of the graphics modeling application.

Based on the foregoing, there is a clear need for an approach for incorporating the use of hardware devices when creating graphical models in graphics modeling applications.

SUMMARY OF THE INVENTION

An approach is described for using hardware devices to generate modified geometry objects based on instructions provided by extension objects. According to one aspect of the invention, an extension object is associated with a sequence of components, such as a modifier stack, that is used to make modifications to a geometry object. Based on the sequence of components, an initial representation of the geometry object is generated. Instructions that are based on the extension object are associated with the initial representation. A graphics device, such as a hardware shader, is used to generate a final representation of the geometry object based on the instructions and the initial representation.

According to other aspects, the instructions may include interface code that is to be executed by a set of routines, such as by an application program interface, to provide device instructions to the graphics device for generating the final representation of the geometry object. Also, the instructions may be generated based on the extension object, and the graphics device may execute the device instructions to generate the final representation of the geometry object.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1A:
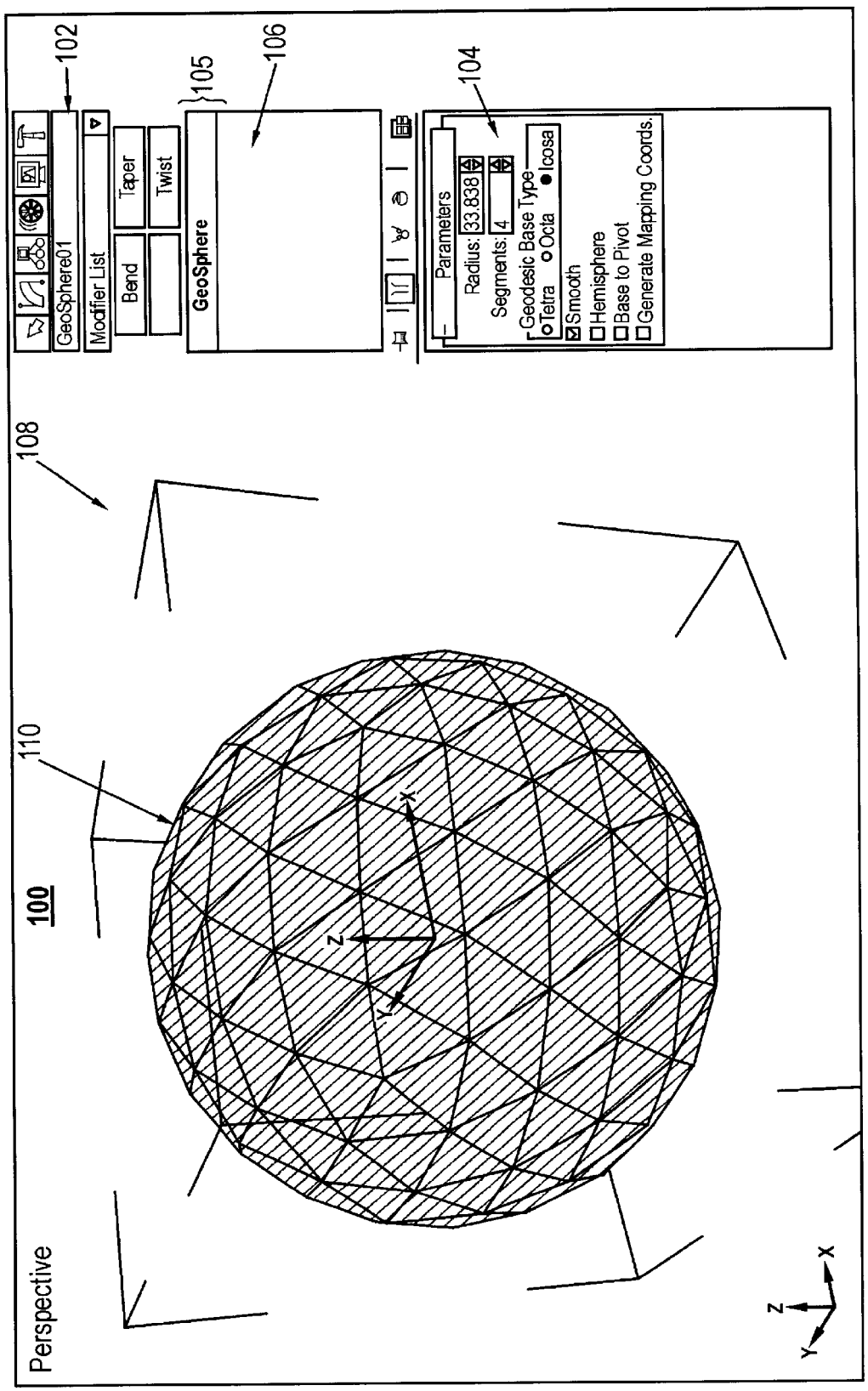
FIG. 1A depicts a conventional modeling program interface with a modifier stack for a sphere object.
Figure 1B:
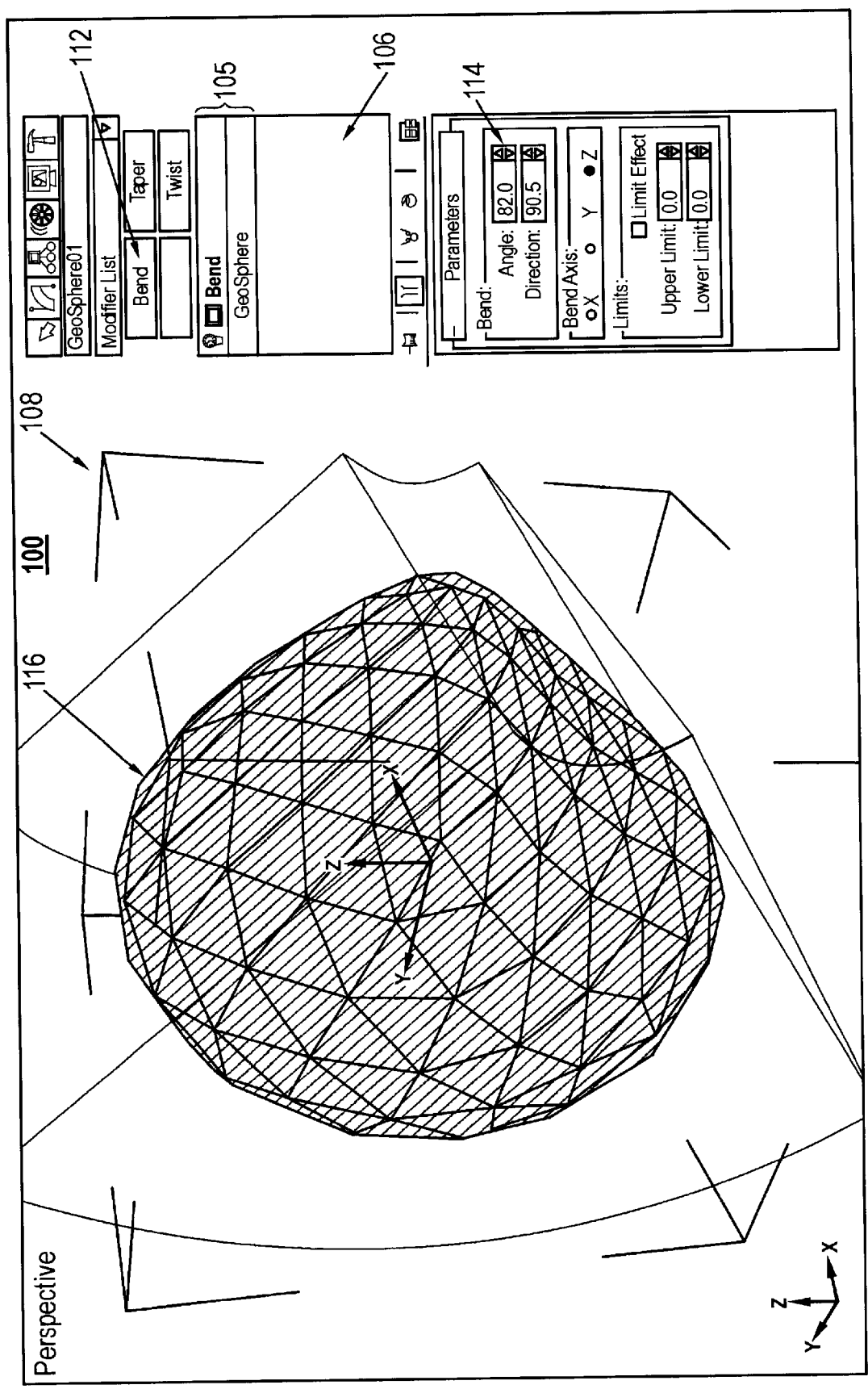
FIG. 1B depicts the conventional modeling program interface with a modifier stack for a sphere/bend object.
Figure 1C:
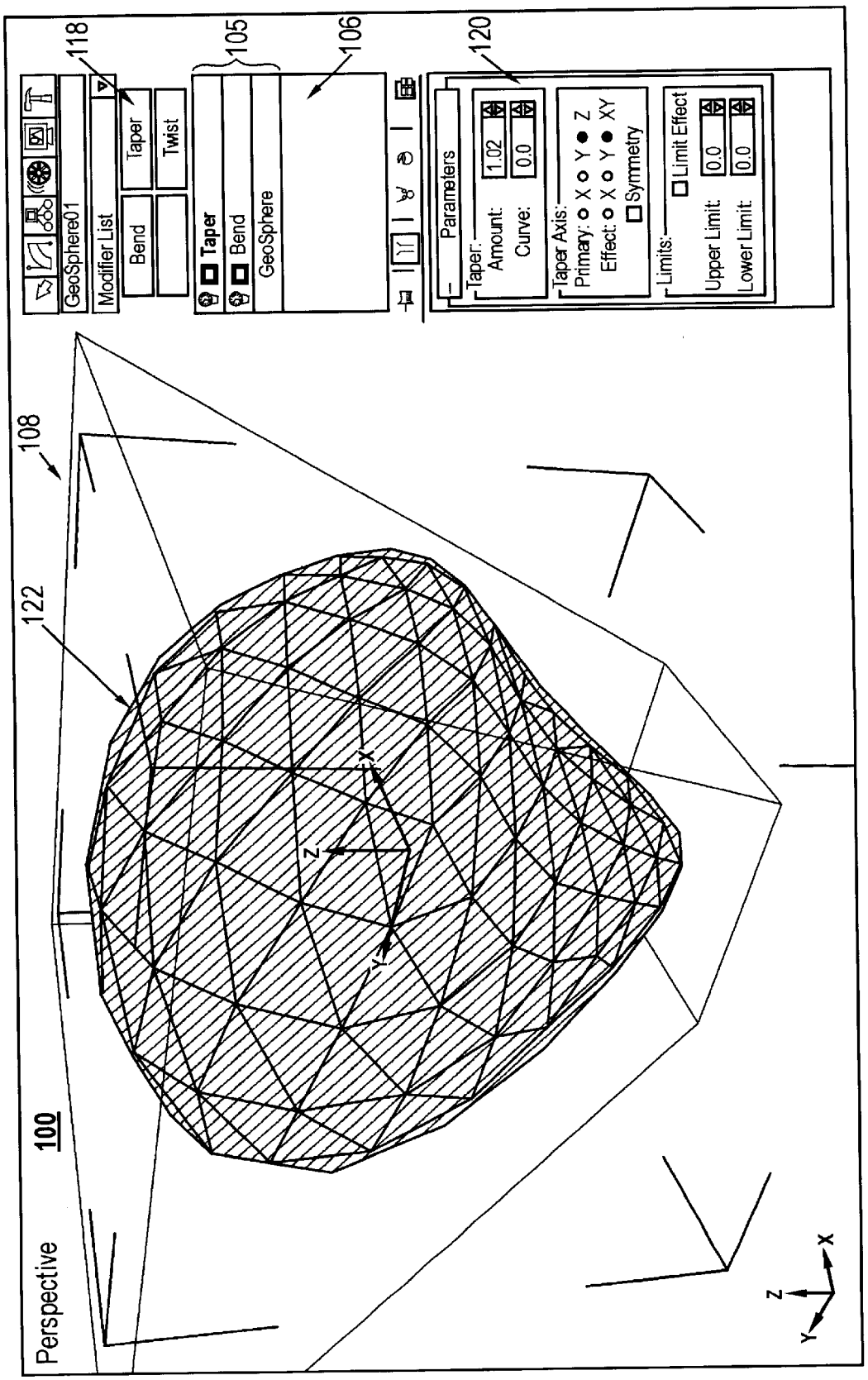
FIG. 1C depicts the conventional modeling program interface with a modifier stack for a sphere/bend/taper object.
Figure 1D:
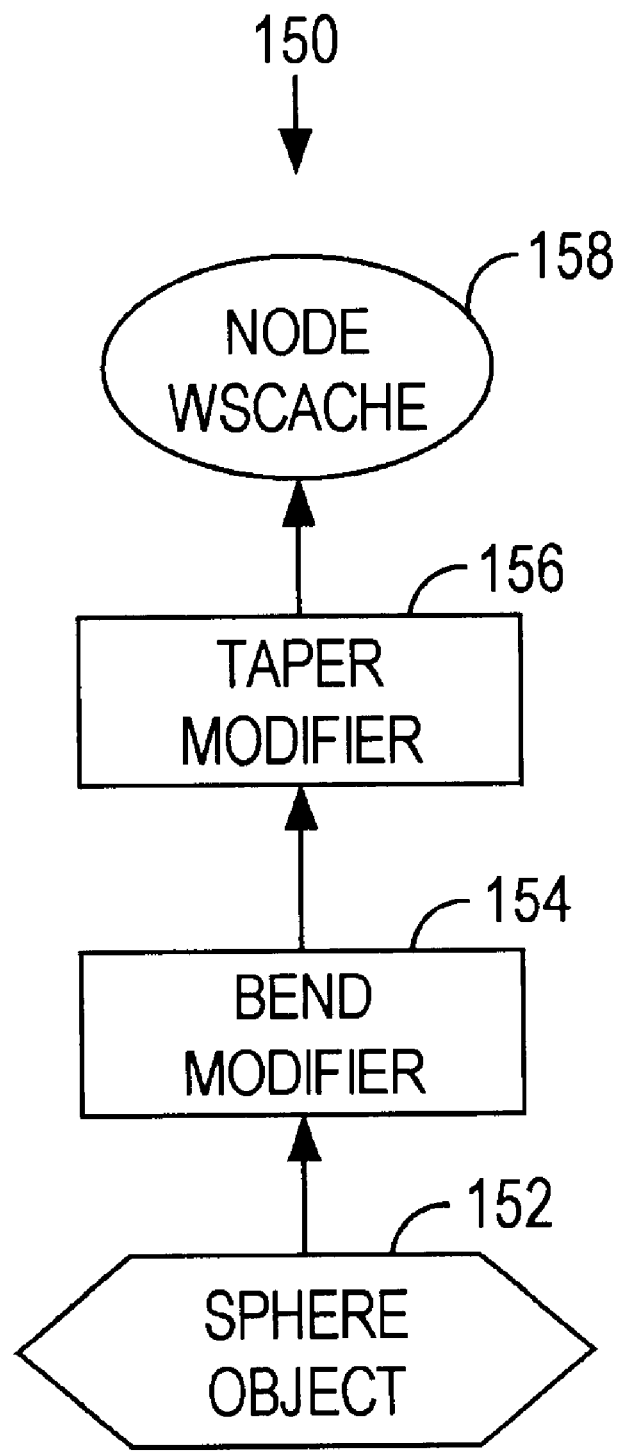
FIG. 1D depicts a conventional underlying modifier stack for the sphere/bend/taper object of FIG. 1C.

An approach for using hardware devices to generate modified geometry objects based on instructions provided by extension objects is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

System Overview

A stack extension mechanism is provided for supporting extension channel objects with an ordered sequence of components. For example, in a stack, each component in the stack is applied, or evaluated, to a geometry object according to the order in which the components are organized, or sequenced, in the stack. As a result, once a particular component is evaluated, the component is no longer able to influence later changes to the geometry object after subsequent components are evaluated. However, by using an extension object that is passed up the stack as the components in the stack are evaluated, the extension object is able to carry along data and perform actions after subsequent applications of other components. For example, an extension object can be used to compare the geometry object both before and after a modifier is applied and to highlight particular changes based on the comparison. As another example, if a modifier results in the combination of two faces of an object, the extension object can be used to specify how to determine a particular property of the combined face based on the properties of the original two faces. In general, the extension object can be used to modify data that is associated with the extension object, modify data associated with the object being rendered, or take other actions, including but not limited to changes to how the geometry object is displayed. As used herein, the term "extension object" refers to an object that is associated with a stack and that can be used to carry data or perform actions at other positions in the stack than the position at which the extension object is established.

In some embodiments, a user interface is provided that allows a user to associate an extension channel (XTC) object with a geometry object that is passed up a stack. For example, the extension object may be implemented as a transient data structure that is recreated based on an extension component in the stack each time the extension component is evaluated as part of the evaluation of the stack.

In some embodiments, the XTC object may be associated with an extension channel. The extension channel can be used in addition to other types of channels that are associated with the modifier stack, and the XTC object may be associated with one or more of the other types of channels. Channels are discussed in detail below.

For explanation purposes, the terms "extension channel," "extension channel object" and "XTC object" are generally used to describe the techniques herein, but the techniques are not limited to implementations that have an extension channel and an extension channel object. For example, an extension object may be implemented according to the techniques described herein without a corresponding extension channel.

Note that while the examples herein are often described in terms of a modifier stack that is part of a graphics program, the techniques described herein are equally applicable to other stacks, or more generally to any list, sequence, network, or other set of modeling operations, that may be implemented in software, hardware, or a combination thereof. For example, the techniques described herein may be applied to a set of modeling operations that is implemented in graphics hardware, including but not limited to hardware shaders, in which the set of modeling operations may be performed by components such as vertex shaders and pixel shaders with which extension objects may be used, as described herein.

In some embodiments, the XTC objects extend the flexibility of a stack by providing a notification mechanism that allows lower-ordered components of the stack to influence changes that are made by higher-ordered components within the stack. For example, by associating an XTC object with a geometry object that is being passed up a modifier stack, a notification mechanism can be provided whereby the XTC object is notified by the modifier stack in response to a particular event occurring during the evaluation of the modifiers in the modifier stack. Specifically, the modifier stack may inform the XTC object prior to and subsequent to a change being made to the geometry object. In response to the notification, the XTC object can take one or more actions, including but not limited to, propagating up the modifier stack data, constraints, properties, and actions that are associated with the XTC object. Thus, in one aspect, the XTC objects provide a mechanism that allows a lower-ordered base object or a lower-ordered modifier to influence how a higher-ordered modifier is applied within a modifier stack.

In some embodiments, a user interface provides a set of predefined class object methods that define specific actions that trigger the notification of an XTC object. The set of predefined class object methods provide a notification mechanism that can be used for controlling the particular events that trigger the notification of an XTC object as the XTC object is passed up the modifier stack with the associated geometry object. In addition, the notification mechanism can be used by other components, such as other modifiers, in addition to being used by XTC objects.

For example, a modifier that is associated with an XTC object, herein referred to generally as an "XModifier," can be inserted into a modifier stack to cause an XTC object to attach to the geometry object that is based on a lower-ordered geometry object. Thereafter, in response to a higher-ordered bend modifier being applied to the geometry object, the notification mechanism causes the XTC object that is attached to the geometry object to be notified. In response to the notification, the XTC object can take certain actions to influence how the higher-ordered bend modifier is to be applied to the geometry object. For example, the XModifier may allow the user to specify that the XTC object highlight all the faces on the geometry object that meet a specified size criteria that could cause problems when using the object in a game engine, so that the user can quickly discern such problematic faces while designing the object.

In some embodiments, multiple XTC objects may be attached to a geometry object as the geometry object is passed up a stack. Each XTC object may be associated with different constraints and/or properties, and may be configured to respond to a variety of different events that may occur during the evaluation of the modifier stack. When multiple XTC objects are attached to a geometry object, a priority ordering may be established that defines a specific order in which the multiple XTC objects are evaluated. For example, by associating a priority field with the XTC objects, a user may define a specific order in which multiple XTC objects within a modifier stack are to be evaluated.

Objects, Rendering Pipelines, and Channels

Objects, rendering pipelines, and channels are discussed in detail in U.S. Pat. No. 6,061,067, entitled APPLYING MODIFIERS TO OBJECTS BASED ON THE TYPES OF THE OBJECTS, the entire disclosure of which is hereby incorporated by reference in its entirety for all purposes herein, and upon which the following discussion in this section is based.

(1) Overview of Objects

In one embodiment of the invention, the 3D modeling and animation application has an object-oriented design, meaning that the application has a class hierarchy that supports inheritance. This section describes the class hierarchy used to create stacks such as modifier stacks. Table 1 depicts the class hierarchy in one embodiment of a 3D modeling and animation application. Each of the classes is described below.

TABLE 1

```
Animatable
    ReferenceMaker
        ReferenceTarget
            BaseObject
                Modifier
                Object
                    GeometricObject
                        TriObject
                            SimpleObject
                        PatchObject
                        ParticleObject
                            SimpleParticle
                    ShapeObject
                        SplineShape
                            SimpleSpline
                        LinearShape
                            SimpleShape
                    WorldSpaceModifierObject
                        SimpleWorldSpaceModifierObject
```

(2) Animatable Class

The Animatable class is the superclass of all the animatable classes. Although no instances of Animatable are used, instances of the Animatable's subclasses include methods that support the animation of an instance of that particular subclass. Also, the Animatable class includes a class identifier and associated properties.

(3) Reference Maker & Reference Target

The ReferenceMaker class and the ReferenceTarget classes work together to support references between objects in a scene. A reference within a scene occurs when one object depends upon another object for rendering. For example, different objects (e.g. two derived tubes) may share the same master object, or base object. As used herein, the term "master object" is synonymous with "base object." In this example, the base object becomes the target of references from the objects. The reference allows a scene to be rendered and allows for the use of modifiers by multiple objects. The reference allows changes in the base object to be broadcast to any objects that are referring to that base object.

The ReferenceMaker class includes the methods for indicating that a particular instance depends on another instance. The ReferenceMaker class also includes methods for receiving messages from reference target objects when changes are made to that reference target object. The ReferenceTarget class includes the methods for indicating that a particular instance is target of a reference. The ReferenceTarget class supports the broadcast of messages to all referring reference maker objects about changes to that reference target object. As with the Animatable class, no instances of ReferenceMaker or ReferenceTarget are used in the application. Instead, instances of these classes' subclasses are used.

(4) BaseObject

The BaseObject class includes the methods for providing a three dimensional graphical representation of an object on a display device. The BaseObject class includes methods for providing different display methods (e.g., bounding box, wireframe, etc.) for each subclasses of the BaseObject class. In one embodiment, these display methods are overridden by equivalently named methods in the BaseObject's subclasses.

(5) Modifier

The Modifier class includes the methods for modifying objects during the rendering process. Instances of the Modifier's subclasses provide a set of very powerful and flexible features that greatly enhance the usability of the 3D modeling and animation application. Each instance of a Modifier subclass has methods for causing a particular modification of an object, such as a bend or a twist. Modifiers change the look of an object by, for example, changing the object's vertices or the object's topology. Modifiers can be stacked together so that the output of one modifier is fed into the input of another modifier, thereby providing a user with a virtually endless number of combinations. Modifiers can be shared through references.

In one embodiment, each Modifier subclass modifies only specific types of objects. For example, instances of the Bend class can modify geometric objects and shape objects while instances of the EditSpline class can only modify shape objects.

There are two main subclasses of Modifier: ObjectSpaceModifier and WorldSpaceModifier, as described below.

(6) ObjectSpaceModifier

The ObjectSpaceModifier class is a subclass of the Modifier class. The ObjectSpaceModifier class is the superclass of the object space modifier classes. Before further describing the ObjectSpaceModifier class, the various coordinate spaces are described.

Different spaces are used to differentiate different sets of spatial coordinate systems. For example, two relevant spatial coordinate systems, object space and world space, can be used.

Object space is the coordinate system unique to each object in a scene. For example, every object has a local center and coordinate system defined by the location and orientation of the object's pivot point. The local center and coordinate system of an object combine to define that object's object space.

World space is the universal coordinate system used to track objects in a scene. World space relates the coordinates defining an object to the other objects in the scene. An object in a scene is located in world space by that object's position, rotation and scale (i.e., the "transforms" of the object).

Returning to the description of the ObjectSpaceModifier class, instances of the subclasses of ObjectSpaceModifier modify an object in object space. For example, a bend is an object space modifier that causes an object's definition to change so that some portion of the object is bent relative to some other portion of that object.

(7) Manipulating Object Space Modifiers

Before describing world space modifiers, a description of an approach for interacting with object space modifiers is described. Not only is a user allowed to change the parameters of an object space modifier by directly entering the values of the parameters, but the user is also allowed to manipulate a 3D representation of the modifier.

For example, in some implementations, the 3D representation of the modifier is called a gizmo. The gizmo is a wireframe representation of that gizmo's modifier. A gizmo acts like a mechanical apparatus that transfers the modification to the object that gizmo is attached to. That is, by changing the gizmo, the user is changing the values of the parameters of the modifier. A user can move, scale and rotate a gizmo as is done with any other object.

As another example, the gizmo can represent parameters of a modifier that are not otherwise easily definable and/or accessible by a user. For example, a modifier may have a center, defined by an {x, y, z} coordinate, a scale along each axis, and a rotation along each axis, which is a great deal of information. However, by providing the user with a three dimensional representation of such modifier information, the user can quickly visualize this information and make changes, thereby changing these values and in turn changing the effect of the modifier on the object.

In other implementations, world space modifiers also have gizmos. For example, an instance of a world space modifier uses a world space modifier object to change the parameters of the world space modifier.

(8) World Space Modifier

Like instances of the ObjectSpaceModifier class, instances of the WorldSpaceModifier class affect the appearance of other objects. The difference is that world space modifiers affect objects in world space coordinates. Also like the ObjectSpaceModifier class, WorldSpaceModifier has a number of subclasses that can be instanced to modify objects in different ways.

One or more objects are modified by a world space modifier by binding those objects to the world space modifier. For example, the binding process is performed by creating a reference between the world space modifier and each object that is bound to that world space modifier. A world space modifier has no effect on an object in a scene that is not bound to the world space modifier. When multiple objects are bound to the same world space modifier, the world space modifier's parameters affects all the objects equally. However, each object's distance from, and spatial orientation to, the world space modifier can change the world space modifier's effect. Because of this spatial effect, simply moving an object through the world space can change the effect. Additionally, an object can be bound to multiple world space modifiers.

For example, to show a dolphin swimming, a user need only model the dolphin and then bind the dolphin to an instance of a Wave world space modifier. As the dolphin object translates through the world space, the dolphin will be modified by the wave to appear to be swimming.

In some implementations, each world space modifier includes a graphical representation of itself. As noted above, this graphical representation is a gizmo in some implementations or in other implementation, this graphical representation is an instance of a subclass of the Object class. Each Modifier subclass knows which objects the Modifier subclass can modify.

In some implementations, a plug-in architecture is used to allow additional object space and world space modifiers to be added to the 3D modeling and animation application.

(9) Object

As noted above, the term object refers to something in a scene. Generally, all objects are defined by three general properties: a collection of creation parameters, a pivot point, and a bounding box. The three general properties describe the form, local origin, initial orientation, and the extent of an object.

The Object class is the superclass of all the different types of objects in a scene. In one embodiment, the Object class has the following subclasses: GeomObject (geometry object), ShapeObject, WorldSpaceModifierObject, and DerivedObject.

The GeomObject class is the superclass of basic renderable objects, such as tubes, cylinders, boxes, polyhedra, spheres, torus, and cones. The following are examples of geometric object categories.

Standard Primitives—3D geometric objects such as Box, Sphere, and Cylinder.

Patch Grids—are 2D surfaces.

Particle Systems—are animated objects that simulate rain, snow, dust and similar collections of small objects.

Shapes—include 2D objects line lines and donuts and 3D spline-based shapes like a helix. Shape objects may not be directly renderable, depending on the implementation. The shape objects need to first be modified before they are renderable.

World Space Modifier Object—is not a renderable object, but is still visible to the user. A world space modifier object is like a gizmo for an object space modifier. The world space modifier object provides a visual representation of a world space modifier that allows the user to bind an object to the corresponding world space modifier.

Derived Object—includes a list of modifier objects and a pointer to the base object. In rendering a scene, a user always sees a derived object, even if no modifiers are applied to an object. The reason for this is that the derived object not only ensures that a particular object is correctly rendered, but also that an appropriate cache is maintained for that particular object.

The above class hierarchy depicts only one class hierarchy. Other implementations may include other class hierarchies. For example, the classes under the ShapeObject are moved under the GeometricObject class. As another example, the methods in the Animatable, ReferenceMaker and ReferenceTarget classes are combined into the BaseObject class. As yet another example, the ReferenceTarget is a superclass of the ReferenceMaker. As another example, the methods are written in a language that supports multiple inheritance, ReferenceMaker does not inherit from Animatable, nor does BaseObject inherit directly from ReferenceTarget, however the Modifier class and the Object class multiply inherit from the Animatable, ReferenceTarget and BaseObject.

(10) Rendering Pipeline

Figure 8:
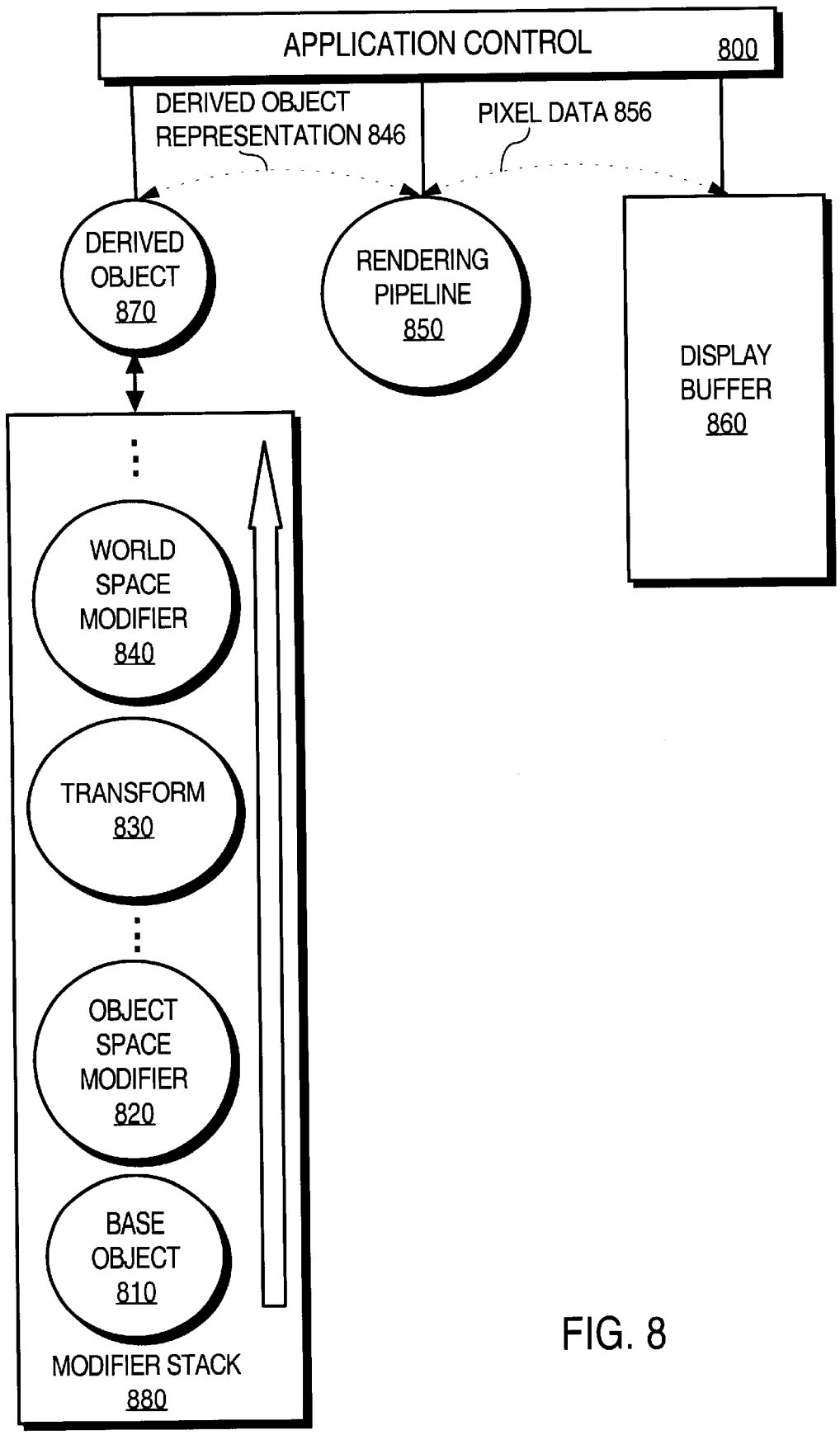
FIG. 8 depicts an approach for rendering objects in a scene according to an embodiment of the invention.

FIG. 8 and the following discussion describe how objects in a scene are rendered in one embodiment of a 3D modeling and animation application. So as not to obscure this embodiment of the invention, FIG. 8 has been simplified. The following first describes the elements of FIG. 8 and then the operation of those elements.

FIG. 8 includes a module for application control 800, a derived object 870, a modifier stack 880, a base object 810, an object space modifier 820, a transform 830, a world space modifier 840, a rendering pipeline 850 and a display buffer 860. These elements work together to render a graphical representation of the derived object onto a display device.

The application control 800 controls the operation and interaction between the elements of FIG. 8. For example, the application control 800 can include the 3D Studio Max™ core software architecture. However, other methods for controlling the various elements in FIG. 8 may be used.

The derived object 870 is part of a scene (not shown) and is responsible for ensuring that a modified object is properly rendered. The derived object is an instance of the DerivedObject class. The derived object instance is created when a user creates an object in a scene.

Derived object 870 maintains a modifier stack 880. The modifier stack 880 includes a list of modifiers (e.g. object space modifier 820 and world space modifier 840), a transform 830, and a pointer to a base object 810. The derived object 870 maintains a reference to base object 810, a reference to transform 830, and a list of modifiers. Other variations may be used in which the derived object 870 maintains the information necessary to generate a description of a modified object, which is labeled as the derived object representation 846.

A more detailed description of the elements in the modifier stack 880 is now provided. The base object 810 includes a parametric definition of an instance of a subclass of Object (e.g. the topology—such as the mesh, direction of faces—and geometry—such as the vertices and edges). The user does not see the base object 810 but sees the rendered result of the modifiers and transform identified by the derived object 870.

The object space modifier 820 is an instance of a subclass of the class ObjectSpaceModifier. The transform 830 is responsible for transforming points in the object space coordinate system to corresponding points in the world space coordinate system. Unlike modifiers, transform 830 is independent of an object's internal structure. Transform 830 acts directly on the object's local coordinate system. The local coordinate system for an object can be expressed as a matrix of values that specify the following information in world space: position of the object's center, rotation of the object in world space, and the scale of the object along it local axes. The world space modifier 840 is an instance of a subclass of the class WorldSpaceModifier. The modifier stack 880 includes zero or more object space modifiers and world space modifiers.

In response to a request for a representation of itself, the derived object 870 provides the application control 800 with a derived object representation 846. Depending on the type of rendering being done and the type of base object 810, the derived object 870 will provide a bounding box, topology, geometry and/or texture map description of the modified and transformed base object 810. How the derived object 870 creates the derived object representation 846 is described below.

The derived object representation 846 is then used by the rendering pipeline 850 to create a bit pixel data 856 representation of the modified and transformed object. The rendering pipeline 850 includes processes for converting the parameter information in the derived object representation 846 into pixel data. For example, the rendering pipeline may include rendering processes such as smoothing, highlighting, facets, lit wireframe, wireframe and bound box. As another example, known rendering techniques are used in the rendering pipeline 850. The pixel data 856 includes the pixel information for display on a display device. The display buffer 860 holds the pixel data for display by the display device.

How the derived object 870 creates the derived object representation 846 is now described. When a derived object 870 is asked by the application control 800 to provide a renderable description of itself, the derived object 870 evaluates the base object 810, then any object space modifiers such as object space modifier 820, any transforms such as transform 830, and then any world space modifiers such as world space modifier 840, to generate the derived object representation 846.

Specifically, base object 810 provides the basic description of the object. The basic description is then provided to the object space modifier 820 in the modifier stack 880. Object space modifier 820 modifies this basic description to generate a modified description. If present, other object space modifier are then evaluated to modify the previous modified description. This process continues until each object space modifier has been evaluated. The object space modifiers are evaluated in the order they appear in the object modifier stack 880.

Next transform 830 is evaluated. In some implementations, each derived object 870 has only a single transform 830 and that transform is always evaluated after the object space modifiers 820. If a user wishes to apply a transform before one or more object space modifiers, the user can use an instance of the XForm object space modifier class. After transform 830, the world space modifier 840 is evaluated. World space modifiers are evaluated in a manner similar to the object space modifiers, and more than one world space modifier may be used. In particular, the world space modifiers are evaluated in the order that they are added to the modifier stack 880.

(11) Channels

In some implementations, each derived object 870 provides the derived object representation 846 in response to a request to provide that information. However, the contents of that information may vary depending on the type of request. For example, a bounding box representation need not have the same detailed information as a smoothed representation. Additionally, during an animation, for example, only part of a derived object representation 846 may change. For example, during the animation, the topology of the bound cylinder does not change, but the geometry does change. Therefore, even though the same request may be made of the derived cylinder (e.g., wireframe representation request), only the geometry values are changing in each frame of the animation. Given that different types of data may need to be generated because of the different types of messages, and that even for the same request only some of the data may change in the next frame, the creation of the derived object representation 846 may be divided into value generating channels.

A channel corresponds to a different portion of a derived object representation 846. Each channel is responsible for generating the channel's own portion of the derived object representation 846. Each element in the modifier stack 880 affects values in one or more of the channels. The results of an evaluation of a modifier in a channel is called a channel intermediate result. In some implementations, providing a derived object representation 846 includes determining which channels need to be accessed.

Next, the elements in the modifier stack 880 that affect the values in those channels are evaluated. Evaluating the elements affecting a channel involves generating a series of channel intermediate results until the last element is evaluated. The results of evaluating the last element in the modifier stack is that channel's portion of the derived object representation 846.

For example, transform 830 affects values in at least the geometry channel in the derived object representation 846. Therefore, an evaluation of transform 830 in the geometry channel generates a set of geometry channel intermediate results. These intermediate results can then be passed onto the next element in the modifier stack 880 that effects the geometry channel. When the last element is evaluated, the geometry values are included in the derived object representation 846.

Figure 9:
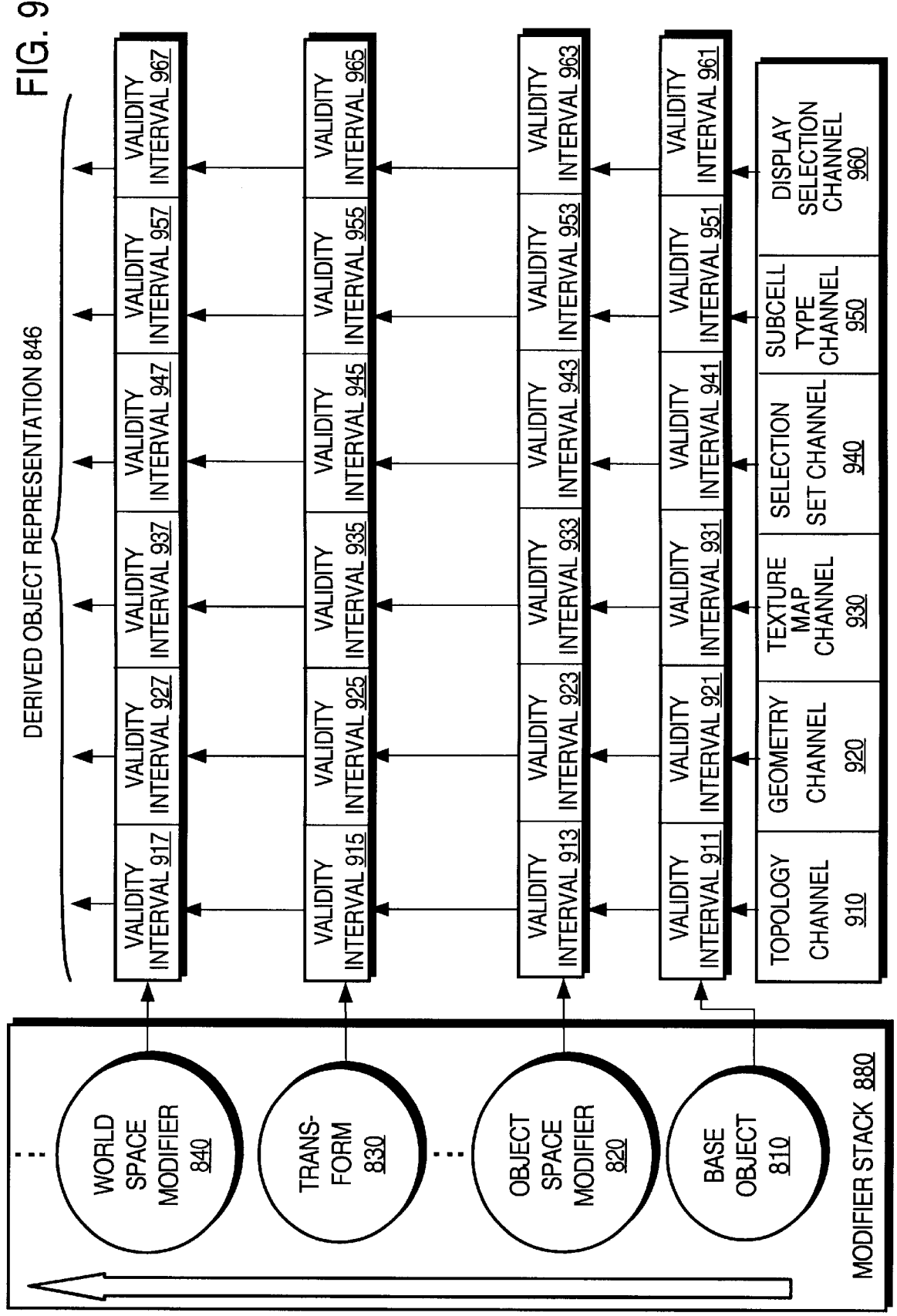
FIG. 9 depicts examples of different types of channels that may be associated with the elements of a modifier stack, according to an embodiment of the invention.

FIG. 9 depicts examples of different types of channels that may be associated with the elements of modifier stack 880. FIG. 9 depicts a topology channel 910, a geometry channel 920, a texture map channel 930, a selection set channel 940, a subcell type channel 950 and a display selection channel 960. The topology channel 910 determines the topology (e.g., the normal direction of the faces an object) of the derived object 870. The geometry channel 920 determines the geometry (e.g., vertices) of the derived object 870. Most modifiers modify the geometry of the derived object 870. The texture map channel 930 determines the texture mapping coordinates of any texture mapped to the derived object 870. The selection set channel 940 determines an array of bits indicating which vertices are selected by a selection modifier. The subcell type channel 950 determines the type of selection (e.g., for a mesh object, the selection type can be an edge or a vertex). The display selection channel 960 determines how parts of the derived object are to be displayed (e.g., are vertices ticks to be displayed for the derived object 870). Not every derived object 870 needs all of these channels. For example, if no texture map is mapped onto an object, the texture map channel 930 is not needed by the derived object 870.

(12) Caching in Channels

In some implementations, the intermediate channel results may be cached, which may not only include determining the intermediate channel results, but also determining a time period for which those results are valid. This time period is called the, validity interval. An example of a validity interval is where an object has a geometry channel 920 validity interval, for a wave world space modifier, of frame twenty to frame infinity. Because the length of time an intermediate result of the derived object 870 is known to be valid, the validity interval helps optimize the caching of the intermediate channel results.

As depicted in FIG. 9, each element in the modifier stack 880 has an associated validity interval in each topology channel. For example, the object space modifier 820 has a validity interval 913 for the topology channel 910, a validity interval 923 for the geometry channel 920, a validity interval 933 for the texture map channel 930, a validity interval 943 for the selection set channel 940, a validity interval 953 for the subcell type channel 950 and a validity interval 963 for the display selection channel 960.

Associating Extension Channel Objects With Geometry Objects

Figure 2A:
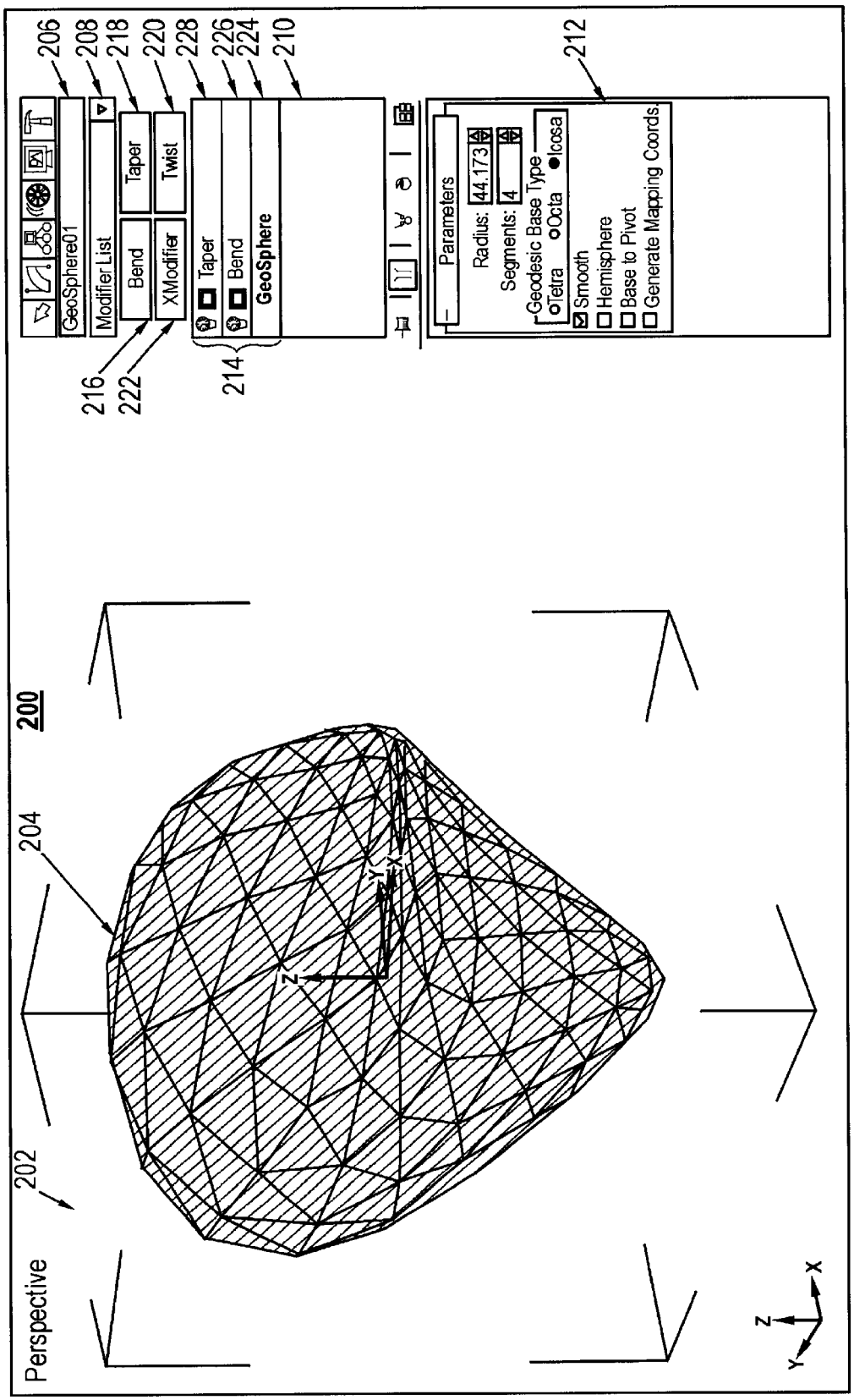
FIG. 2A depicts an example of a user interface window in which certain embodiments of the invention may be utilized.

FIG. 2A depicts an example of a user interface window 200 in which certain embodiments of the invention may be used. For explanation purposes, FIG. 2A is discussed in conjunction with the components of FIG. 2B. Also, while the example depicted in FIGS. 2A and 2B, as well as the subsequent examples in the remaining figures, are described in terms of a modifier stack composed of modifiers, the techniques are equally applicable to any type of stack having a sequence of components.

As depicted in the example of FIG. 2A, a user interface window 200 is provided that includes a display window 202, a base object name identifier 206, a modifier selection menu 208, a stack window 210, a parameter menu 212, a set of modifier buttons (216, 218, 220), and an extension channel modifier button 222.

Base object name identifier 206 identifies the name that is currently associated with the rendered object. Parameter menu 212 provides a list of parameters that are associated with the selected base object type and that can be used to define specific parameters of the selected base object. Modifier selection menu 208 provides a drop-down menu that allows a user to choose a modifier that is to be inserted into the modifier stack. In certain embodiments, the drop-down menu provides a list that shows all applicable modifiers that can be inserted into the modifier stack based on the base object that is currently selected. Modifier buttons (216, 218, 220), on the other hand, are associated with a set of "commonly used" modifiers that allow a user to easily select and insert a commonly used modifier into a modifier stack. Once inserted, the modifiers are applied in sequential order to the geometry object when evaluating the modifier stack.

Figure 2B:
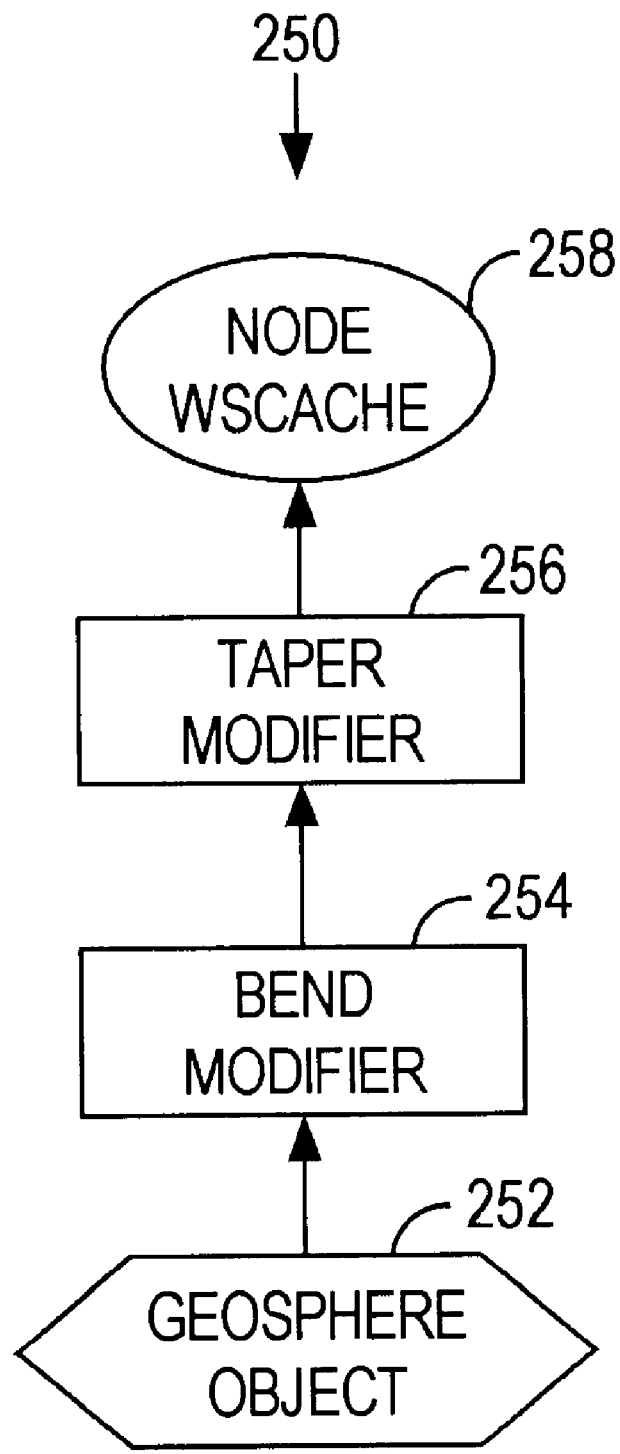
FIG. 2B depicts an example of an underlying modifier stack based on the user selections of FIG. 2A, according to an embodiment of the invention.

Stack window 210 provides a visual representation of the underlying modifier stack that has been currently defined by the user. In this example, the user has defined a modifier stack 214 as depicted in stack window 210. Currently, modifier stack 214 includes a base object (GeoSphere 224), and two modifiers (Bend modifier 226 and Taper modifier 228). FIG. 2B depicts an example of an underlying modifier stack 250 that has been generated based on the user's current selections as depicted in modifier stack 214.

Parameter menu 212 allows the user to define specific parameter values for the component or item that is currently selected in modifier stack 214. In this example, because the user has selected the base object (GeoSphere 224) as indicated by the highlighting of GeoSphere 224, parameter menu 212 provides a set of parameter options that are associated with a GeoSphere base object. Alternatively, if the user had selected a different component in modifier stack 214, or if the base object was of a different object type, for example a rectangular box, parameter menu 212 would display a different set of parameter options that correspond to that particular object type.

Extension channel modifier button 222 allows a user to insert an XModifier into the modifier stack 214. An XModifier is an example of modifier that is associated with an extension object. Another example could be an XBend modifier that is an enhanced Bend modifier that also defines an extension object. Note that while the examples herein use the convention of adding an "X" prefix to denote a modifier or base object that is associated with an extension object, the use of the "X" prefix is not required. The use of XModifiers is described in further detail below.

Display window 202 provides a window interface for displaying one or more rendered objects. In this example, display window 202 includes a sphere/bend/taper object 204. The sphere/bend/taper object 204 was formed by (1) creating a base object ("sphere geometry object") based on a defined set of GeoSphere parameter values (geosphere object data 252 of FIG. 2B); (2) applying a bend modifier (bend modifier data 254 of FIG. 2B) to a copy of the sphere geometry object to create an updated geometry object ("sphere/bend geometry object"); and (3) applying a taper modifier (taper modifier data 256 of FIG. 2B) to a copy of the sphere/bend geometry object to create a sphere/bend/taper geometry object as depicted by sphere/bend/taper object 204 in display window 202 of FIG. 2A.

As depicted by sphere/bend/taper object 204, a geometry type of "mesh" has been used in evaluating the modifier stack. However, embodiments of the invention are not limited to any particular geometry type. For example, embodiments of the invention may also include a variety of other geometry types, including but not limited to, NURBs, patches, and spline geometry types. Furthermore, the techniques described herein may be applied to stacks in which the geometry type is changed one or more times.

In the example depicted in FIG. 2A, the application of bend modifier 226 and taper modifier 228 have caused certain faces within the sphere/bend/taper object 204 to be shaped as long, thin triangles. Because the ideal face shape when rendering an object is that of an equilateral triangle, the long, thin triangles may be referred to as "problematic faces" due to the artifacts that may distort the object's appearance when the long, thin triangles are rendered.

Figure 3A:
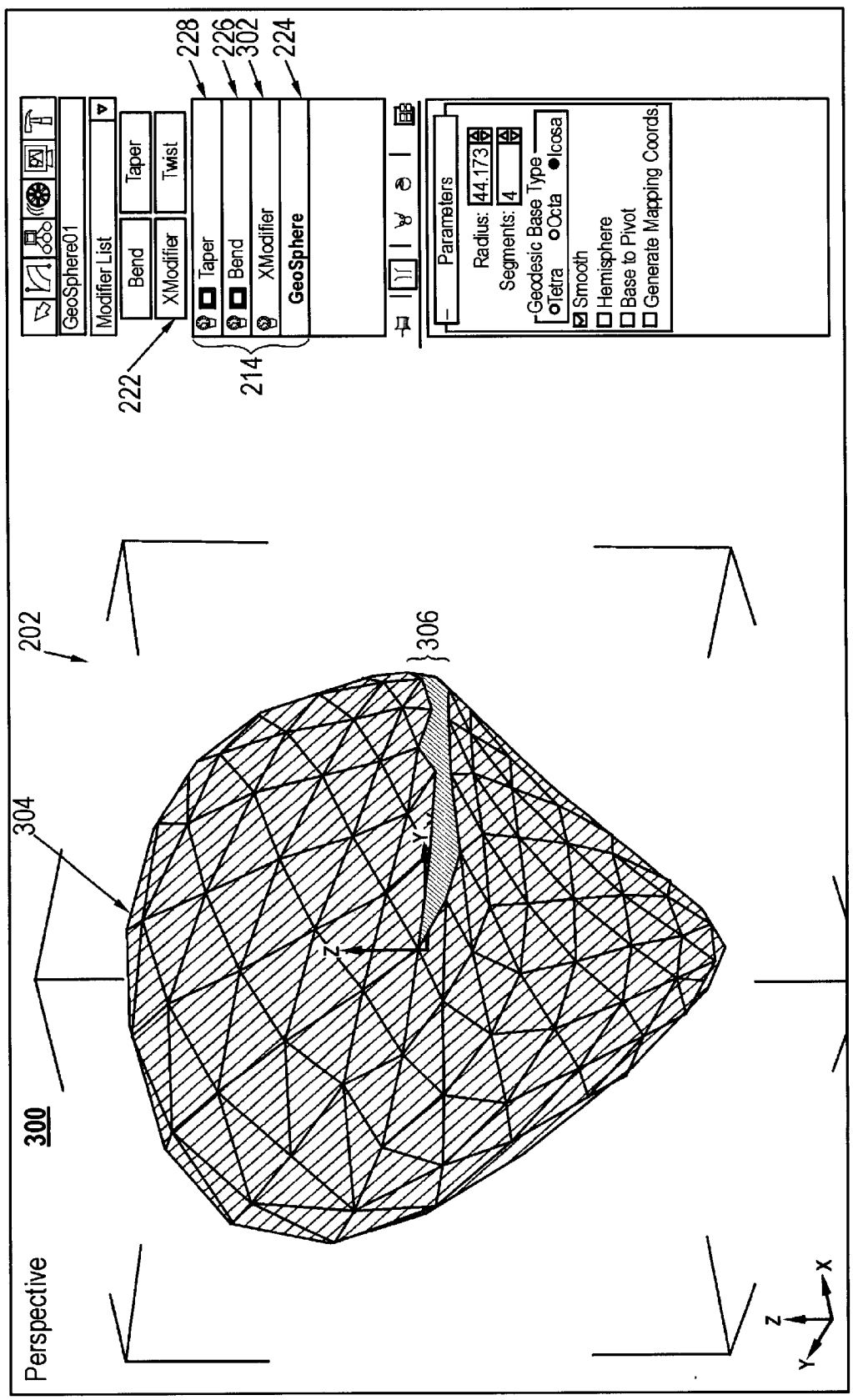
FIG. 3A depicts a further example of a user interface window in which an XModifier is included in the modifier stack, according to an embodiment of the invention.

FIG. 3A depicts an example of a user interface window 300 in which an XModifier has been inserted into the modifier stack to cause an XTC object to be associated with the geometry object is based on a base object, according to an embodiment of the invention. The XTC object remains associated with the geometry object as the geometry object flows up the modifier stack. For explanation purposes, FIG. 3A is discussed in conjunction with FIG. 3B.

Figure 3B:
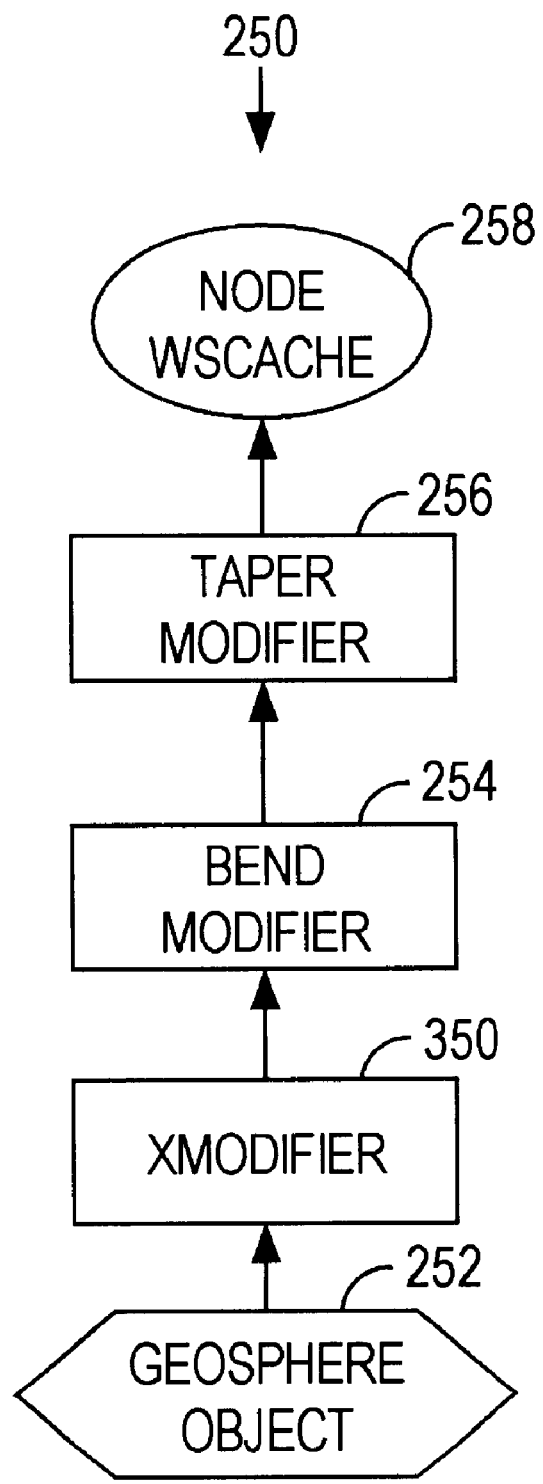
FIG. 3B depicts an example of an updated underlying modifier stack that includes the XModifier based on the user selections of FIG. 3A, according to an embodiment of the invention.

As depicted in the example of FIG. 3A, a user has interacted with user interface window 300 to insert an XModifier 302 into modifier stack 214. Thereafter, when XModifier 302 is evaluated within the modifier stack, XModifier 302 causes an XTC object to be associated with the geometry object that was generated based on GeoSphere 224. For example, in response to the user selecting Geo-Sphere 224, and then selecting extension channel modifier button 222, XModifier data 350 (FIG. 3B) is inserted into modifier stack 250 (FIG. 3B). Thereafter, when XModifier data 350 is evaluated in modifier stack 250, XModifier data 350 causes an XTC object to be associated with the geometry object that is generated by geosphere object data 252.

In certain embodiments, the XTC object functions as a "plug-in" that is attached to a geometry object as the geometry object flows up the modifier stack. In one embodiment, XTC objects employ a notification mechanism, for example a callback mechanism, that is used to notify an XTC object in response to a particular event occurring while evaluating the underlying modifiers of modifier stack 214. For example, the notification mechanism may be configured to notify a particular XTC object prior to and/or after any changes are to be made to the geometry object as the geometry object flows up the modifier stack.

In certain embodiments, the notification mechanism includes identification information that identifies, for example, the name, class, and/or instance of the modifier that is being applied to the geometry object. In response to the notifications, the XTC object can take appropriate actions, such as to ensure that certain defined properties and/or constraints are allowed to flow up the modifier stack and/or to influence the changes that are made by higher-ordered components within the modifier stack. For example, as discussed in further detail below, the appropriate actions may include the modification of the geometry object and/or the "disabling" of a higher-ordered component within the modifier stack.

Figure 3C:
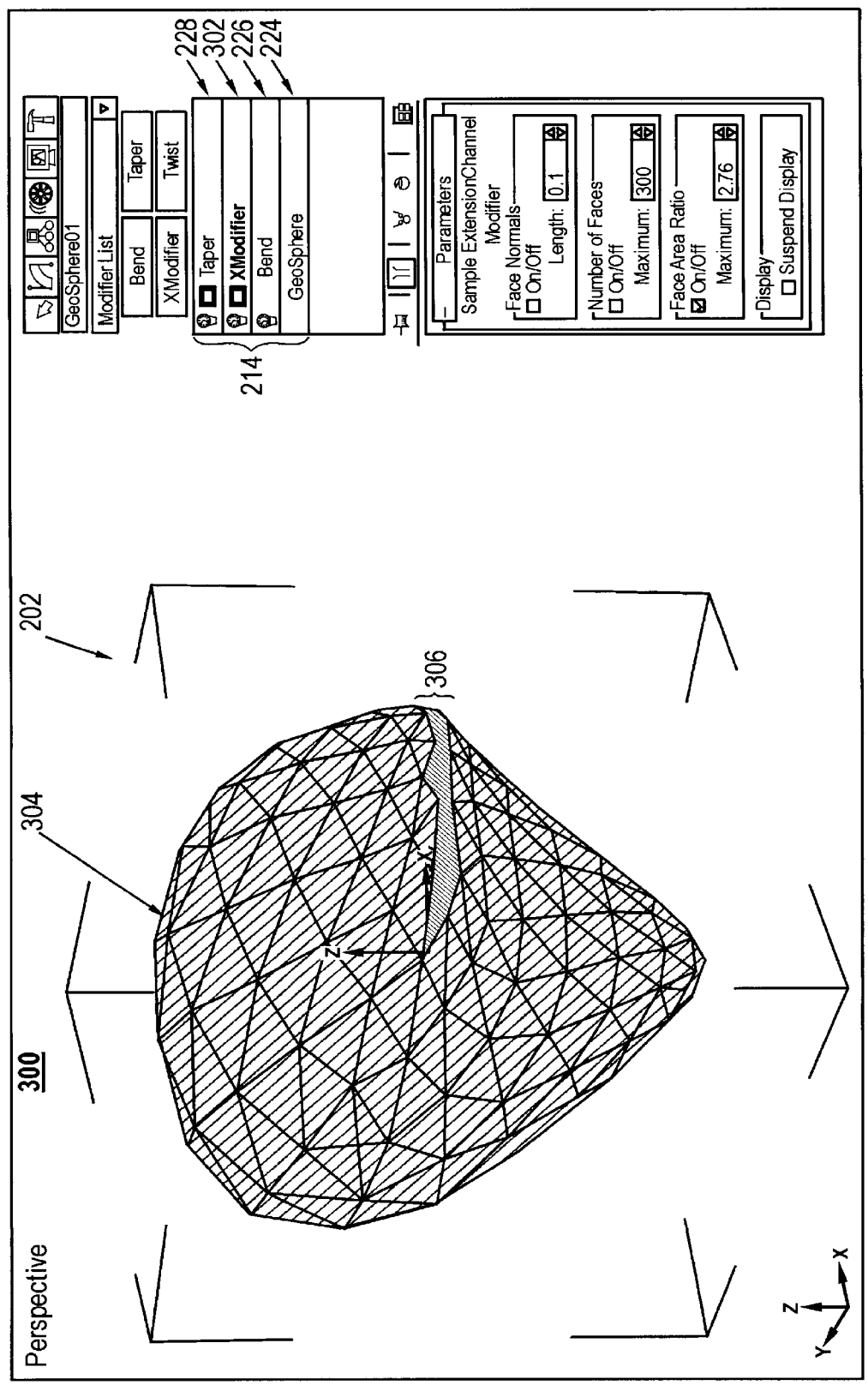
FIG. 3C depicts a further example of a user interface window in which the XModifier is relocated in the modifier stack, according to an embodiment of the invention.

For example, as previously explained in reference to FIG. 2A, because a size constraint is not active once the geometry object is created and passed up the modifier stack, the application of bend modifier 226 and/or taper modifier 228 has caused sphere/bend/taper object 204 of FIG. 2A to include several problematic faces 306 as depicted in FIG. 3C. However, as depicted in FIGS. 3A and 3B, a user interacts with user interface window 300 to define, for XModifier 302, a minimum size constraint for faces within the geometry object and to insert XModifier 302 into modifier stack 214. As a result, XModifier data 350 is inserted into modifier stack 250, thereby causing an XTC object having the minimum size constraint to be attached to the geometry object.

Thereafter, by notifying the XTC object when certain events occur during the evaluation of modifier stack 250, the XTC object may perform specific tasks or actions to allow the constraint to remain "active" as the geometry object is passed up the modifier stack. In particular, by notifying the XTC object prior to, and/or subsequent to a change being made to the geometry object as the geometry object is passed up the modifier stack, the XTC object can take appropriate actions to ensure that certain properties and/or constraints are allowed to propagate up the modifier stack.

For example, as depicted in FIG. 3A, the size constraint has been allowed to propagate up the modifier stack and to influence higher-ordered components (bend modifier 226, taper modifier 228) to cause a set of problematic faces 306 to be displayed using a different color, shading, or cross hatching as depicted in sphere/bend/taper object 304. As a result, a user to can quickly identify any problematic faces that are contained within sphere/bend/taper object 304.

FIG. 3B depicts an example of an updated underlying modifier stack 250 that has been generated based on the user's current selections as depicted in modifier stack 214 of FIG. 3A, according to an embodiment of the invention. In this example, an XModifier (XModifier data 350) has been inserted into modifier stack 250, which causes an XTC object to be associated with the geometry object that is created based on geosphere object data 252. Specifically, XModifier data 350 has been inserted into modifier stack 250 below both bend modifier data 254 and taper modifier data 256. Thus, in evaluating modifier stack 250, XModifier data 350 is evaluated prior to bend modifier data 254 and taper modifier data 256 because the XTC object is attached to the geometry object before bend modifier data 254 and taper modifier data 256 are applied to the geometry object.

By specifying that the XTC object be notified prior to, and/or subsequent to the application of bend modifier data 254 and/or taper modifier data 256, the XTC object can take appropriate actions and thereby to influence what, if any, changes are made to the geometry object by bend modifier data 254 and/or taper modifier data 256.

Figure 3D:
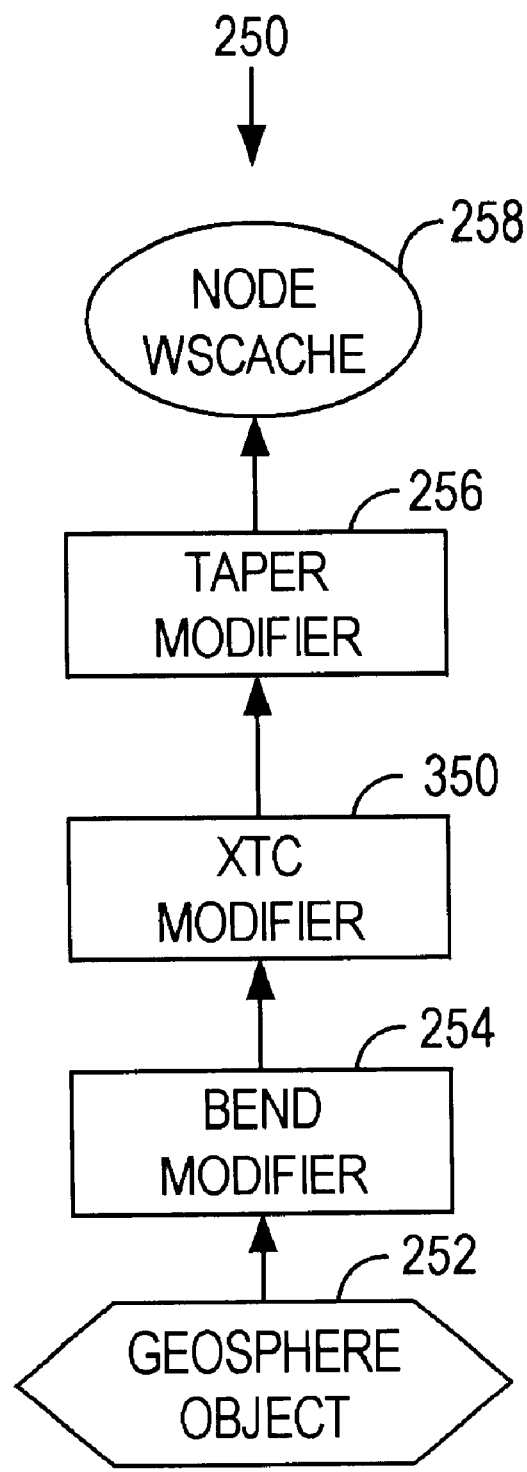
FIG. 3D depicts an example of an updated underlying modifier stack that includes the relocated XModifier based on the user selections of FIG. 3C, according to an embodiment of the invention.

In certain embodiments, an XModifier may be relocated within a modifier stack by selecting the XModifier and then dragging and releasing the XModifier at a different position within the modifier stack. For example, by selecting XModifier 302 in FIG. 3A, and then dragging and dropping the XModifier between bend modifier 226 and taper modifier 228 in modifier stack 214, the XModifier may be relocated within modifier stack 214, as depicted by XModifier 302 in FIG. 3C and XModifier data 350 in FIG. 3D.

As a result of relocating XModifier 302 between bend modifier 226 and taper modifier 228, XModifier 302 is not applied until after bend modifier 226 is applied. In contrast, in FIGS. 3A and 3B, XModifier 302 is applied before bend modifier 226 since XModifier 302 is located before bend modifier 226.

Associating Extension Channel Objects With Base Objects

In addition to using components, such as an XModifier, to attach extension objects to geometry objects, in certain embodiments of the invention, a base object may be defined that when evaluated within the modifier stack, causes an extension object to be associated with the geometry object.

Figure 4A:
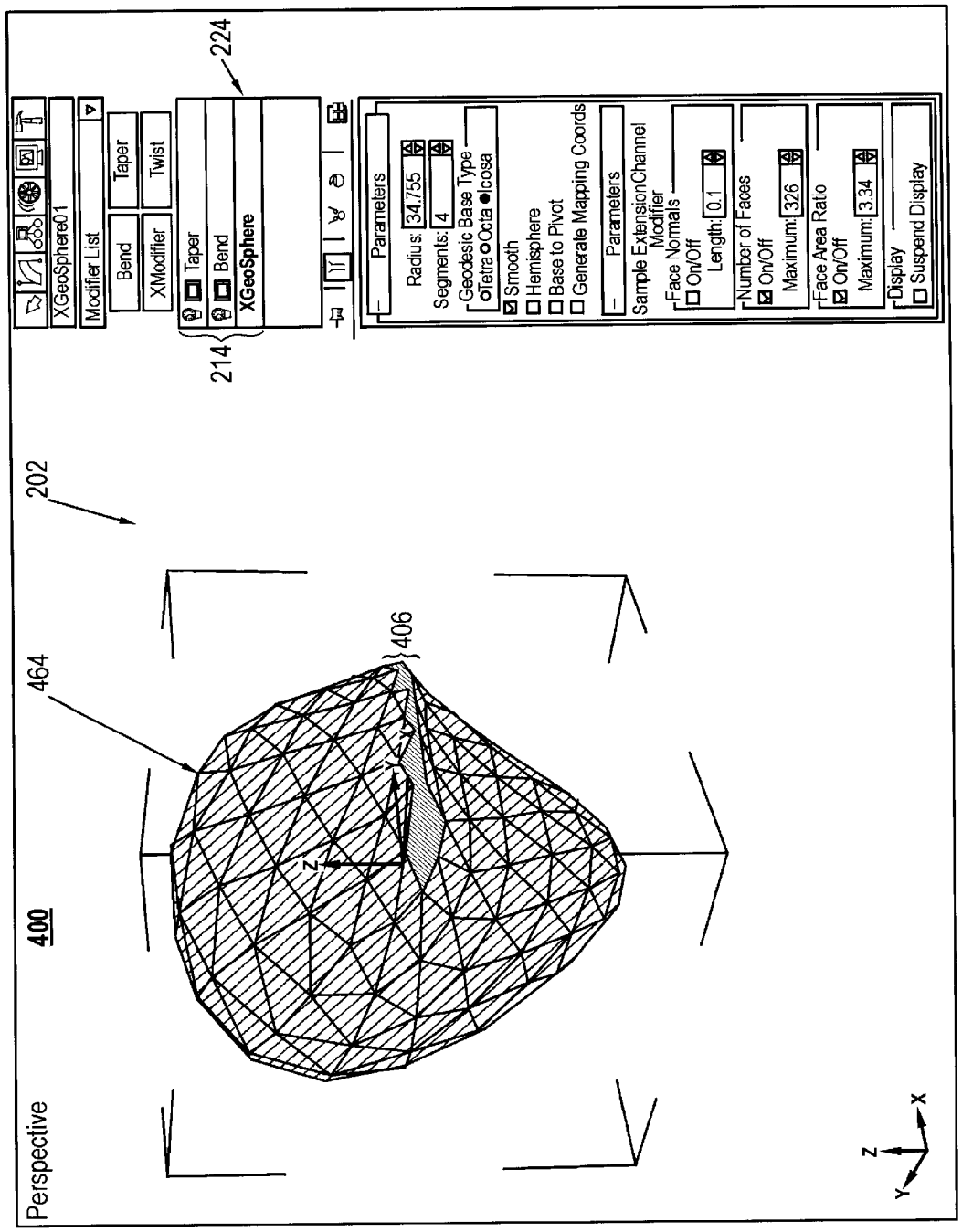
FIG. 4A depicts a further example of a user interface window in which a base object, XGeoSphere, has been defined and inserted into the modifier stack, according to an embodiment of the invention.

For example, FIG. 4A depicts an example of a user interface window 400 in which a base object, XGeoSphere 424, has been defined and inserted into modifier stack 214, according to an embodiment of the invention. In this example, in defining XGeoSphere 424, the user has interacted with user interface window 400 to associate the previously defined face size constraint with XGeoSphere 424.

Figure 4B:
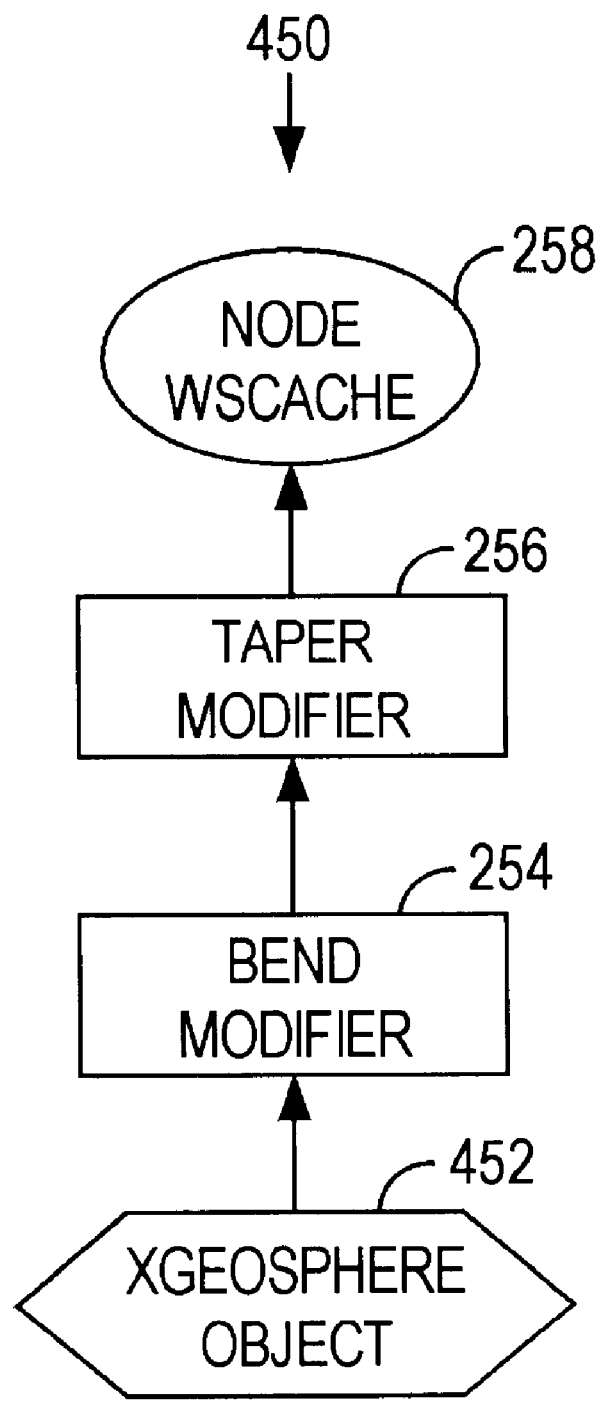
FIG. 4B depicts an example of an underlying modifier stack that includes the base object, XGeoSphere, of FIG. 4A, according to an embodiment of the invention.

FIG. 4B depicts an example of the underlying modifier stack 450 that has been generated based on the user's current selections as depicted in modifier stack 214 of FIG. 4A, according to an embodiment of the invention. In response to the user inserting XGeoSphere 424 into modifier stack 214, XGeoSphere data 452 is inserted into the underlying modifier stack 450. As further evident, the user has also defined a bend modifier (bend modifier data 254) and a taper modifier (taper modifier data 256) as higher-ordered components to modify the geometry object as the geometry object flows up the modifier stack 450.

In response to evaluating modifier stack 450, XGeoSphere data 452 causes an XTC object to be attached to the geometry object that is created based on XGeoSphere data 452. For explanation purposes, it is assumed that the XTC object has been configured to be notified prior to and subsequent to any changes being made to the geometry object as the geometry object flows up the modifier stack 450. Thus, as described in further detail below, as the geometry object flows up the modifier stack 450, the XTC object is notified prior to and subsequent to the application of bend modifier data 254 and taper modifier data 256 to the geometry object. In response to the notifications, XTC object may take specific actions, such as to ensure that geometry object conforms with the previously defined face size constraint or to highlight nonconforming faces.

Enforcing Properties and/or Constraints Within a Modifier Stack

In response to being notified that a particular event has occurred within a modifier stack, a variety of different actions may be taken to ensure that a particular property and/or constraint is allowed to flow up the modifier stack. For example, referring back to FIG. 3B, it is assumed that the XTC object that is generated and associated with the geometry object by XModifier data 350, includes the previously described face size constraint. In response to being notified that bend modifier data 254 is about to be applied to the geometry object, the XTC object may cause a copy of the geometry object ("prior geometry version") to be stored in memory.

When the XTC object is again notified after the change has been made by applying bend modifier data 254 to generate an updated geometry object ("updated geometry version"), the XTC object may compare the states of the prior geometry version with the state of the updated geometry version. Based on the comparison, the XTC object can modify the original geometry object as necessary to create a "new" original geometry version that will cause the application of the bend modifier data 254 to generate a geometry object that conforms to the face size constraint. Thus, once the modifications are made by the XTC object and the new original version is again passed up the modifier stack, the application of bend modifier data 254 will create a geometry object that conforms with the face size constraint.

In certain embodiments, XTC objects may recursively and repeatedly apply changes to a geometry object based on the changes that were made by a higher-ordered modifier. For example, if after determining that the updated geometry object that is created by applying the bend modifier data 254 to the new original version are still inappropriate, the XTC object may further modify the base object data as deemed appropriate. Additional modifications may be made by the XTC until the specified criterion is satisfied or until a particular number of iterations have been performed.

In another embodiment, an XTC object may propagate a particular property and/or constraint up the modifier stack by "disabling" a higher-ordered modifier. For example, referring to FIG. 3B, in response to the XTC object being notified that bend modifier data 254 has been applied to create an updated geometry object, the XTC object may substitute the geometry object for the updated geometry object within the modifier stack 250. Thereafter, the geometry object can flow up the modifier stack 250 where taper modifier data 256 is then applied. By, substituting a later generated (higher-ordered) geometry object with a previously generated (lower-ordered) geometry object, an XTC object has the ability to "disable" higher-ordered modifiers.

Multiple Geometry Object Types

Although certain examples have been depicted in reference to the use of geometry objects having a geometry type of mesh (e.g., "mesh objects"), the techniques described herein are not limited to any particular geometry type. For example, instead of using a mesh object as depicted in the example of FIG. 3A, other geometry types such as splines, patches, NURBs, etc., may be used in evaluating an object within a modifier stack.

In addition, in certain embodiments of the invention, two or more different geometry types may be used in evaluating an object within a stack. Different geometry types are associated with different characteristics. In certain situations, the characteristics of one geometry type (e.g., patches) may be more desirable than the characteristics of another (e.g., NURBs). Thus, it may be desirable to use different types of geometry objects when evaluating a stack. For example, referring to FIG. 3B, a geometry object of type mesh may be used to generate the geometry object based on geosphere object data 252 while a geometry object of type NURB may be used to generate the geometry object based on bend modifier data 254.

In certain embodiments, extension objects are independent of the geometry type such that a particular extension object may be used without modification in conjunction with a stack that uses multiple geometry types. In one embodiment, as the geometry object is converted from one geometry type to another, the XTC object that is associated with the geometry object works with each new geometry type as the geometry object is propagated up the modifier stack. In certain embodiments, a callback message that notifies the XTC object of the geometry type change includes information that identifies the current geometry type and the new geometry type.

Notifications

As previously indicated, extension objects are notified when certain events occur during the evaluation a stack. In one embodiment, a callback mechanism is used to notify an XTC object prior to a change being made to the geometry object. In response to the "prior" notification, the XTC object can perform certain actions prior to the change being made. Additionally, the callback mechanism may be used to notify an XTC object after a change has been made to the geometry object. In response to the "subsequent" notification, the XTC modifier may also perform certain actions subsequent to the change being made.

Figure 5:
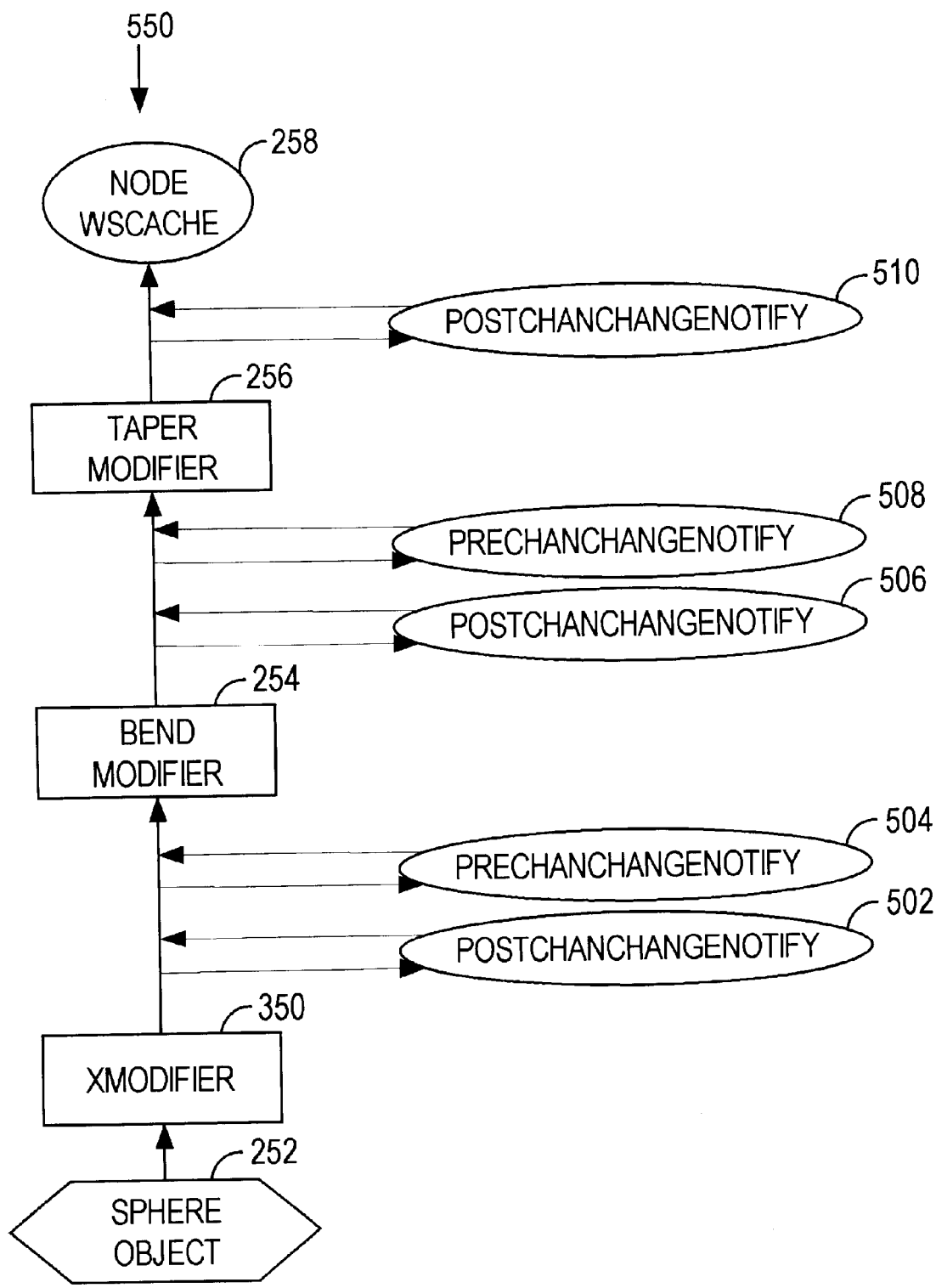
FIG. 5 depicts a set of notification objects that are used to notify an XTC object in response to certain events occurring during the evaluation of a modifier stack, according to an embodiment of the invention.

For example, FIG. 5 depicts a set of notification objects (prechangenotify objects 504, 508, and postchangenotify objects 502, 506, 510) that are respectively used to notify the attached XTC object prior to, and subsequent to, any changes that are made to the geometry object as the geometry object is propagated up modifier stack 550, according to an embodiment of the invention. In this example, the geometry object is modified by (1) Xmodifier data 350 (i.e., associating the XTC object with the base object), (2) bend modifier data 254 and (3) taper modifier data 256. In response to such modifications, postchangenotify objects 502, 506 and 510 respectively notify the XTC object that a change has been made to the geometry object.

In response to each of the "post-notifications", the XTC object may initiate one or more actions that can affect how the previous changes are applied to the geometry object in evaluating modifier stack 550. Similarly, prior to the geometry object being modified by bend modifier data 254 and taper modifier data 256, prechangenotify objects 504 and 508 respectively notify the XTC object that a change is about to be made to the geometry object. In response to each of the "pre-notifications", the XTC object may initiate one or more actions that can affect how the changes are actually applied to the geometry object in evaluating modifier stack 550.

For example, in response to being notified by prechangenotify object 504 that bend modifier data 254 is about to be applied to the geometry object, the XTC object may store the pre-configuration of the geometry object. Subsequent to the application of bend modifier data 254 to the geometry object, and in response to being notified by postchangenotify object 506 that bend modifier data 254 has been applied to the geometry object, the XTC object may compare the pre-configuration of the geometry object with the post-configuration of the geometry object to determine what changes were made to the geometry object by applying bend modifier data 254. Based on these changes, the XTC object can modify or update the base object (geosphere data 252) to cause the sphere/bend geometry object to conform to the properties and/or constraints that were previously defined for the XTC object.

As another example, consider a base object data that specifies that a friction value of "10" is to be associated with face "100" while a friction value of "4" is to be associated with face "101" within the mesh object. In addition, consider an XModifier that is inserted in the modifier stack and that specifies that if two faces having different friction values are combined into a single face, the average of the two fiction values (in this case "7") is to be applied to the combined face. Thus, if in passing the mesh object up the modifier stack a modifier causes faces "100" and "101" to be combined into a single face, the XTC object that is attached to the mesh object by the XModifier can cause the combined face (combination of faces 100 and 101) to be assigned a friction value of "7".

For explanation purposes, examples have been provided depicting a notification mechanism that employs prechangenotify and postchangenotify object methods to notify the XTC object. However, embodiments of the invention are limited to any particular type of object method and/or notification mechanism. For example, EXAMPLE SET A includes a sample list of class object methods that may be used by the notification mechanism while evaluating a modifier stack.

Controlling the Displayed Object

Extension objects can also be used to control how and/or where certain data is displayed within a view port, such as display window 202. For example, referring to FIGS. 3A and 3B, at the end of evaluating modifier stack 250, node wscache 258 generates the geometry object in world space and displays the geometry object in display window 202. For example, node wscache 258 may be associated with a method Display that is used to display the geometry object at the end of the stack. In certain cases, in reaching the end of the modifier stack 250, the XTC object is still attached to the geometry object when the Display method is called to display the geometry object.

In one embodiment, the XTC object is notified prior to the Display method being called. In response, the XTC object can take certain actions to control what information is displayed in display window 202. For example, in response to being notified that the Display method is about to be called, the XTC object can disable the drawing of the geometry object so that only the result of the XTC object is visible. For example, the XTC object could disable the drawing of the geometry objects that only the faces that don't meet a specific size requirement are displayed within display window 202. The following is an example of a sequence that may be used to control the information that is drawn within display window 202.

```
If not (XTCObj->SuspendDisplay( ))
{
    object->Display( );
}
XTCObj->Display( );
```

In certain embodiments, once an object has been displayed within a display window, an XTC object can cause additional items and/or information to be drawn for display within display window 202. As for example, after sphere/bend/taper object 304 is displayed in display window 202, the XTC object associated with XModifier 350 (FIG. 3B) can cause additional objects to be displayed and/or certain information to be displayed with the faces of sphere/bend/taper object 304.

Collapsing a Stack

In certain situations, a user may want to collapse the stack to generate a single editable geometry object that includes the modifications that were defined within the stack. However, a potential drawback with collapsing a stack that includes one or more extension objects is that the extension objects can adversely affect the editable object that is generated from collapsing the stack.

Figure 6A:
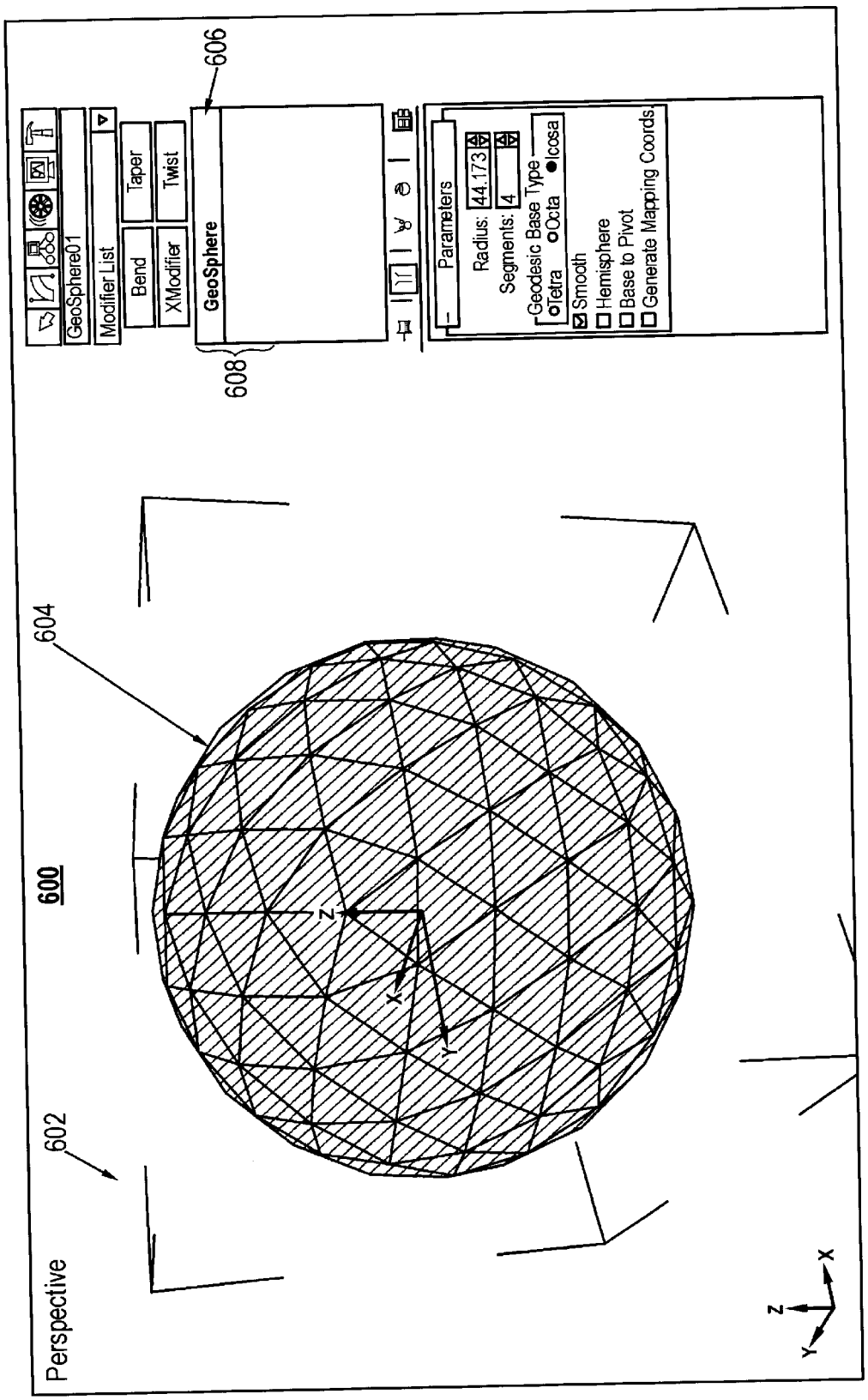
FIG. 6A depicts a modifier stack having a base object, according to an embodiment of the invention.
Figure 6B:
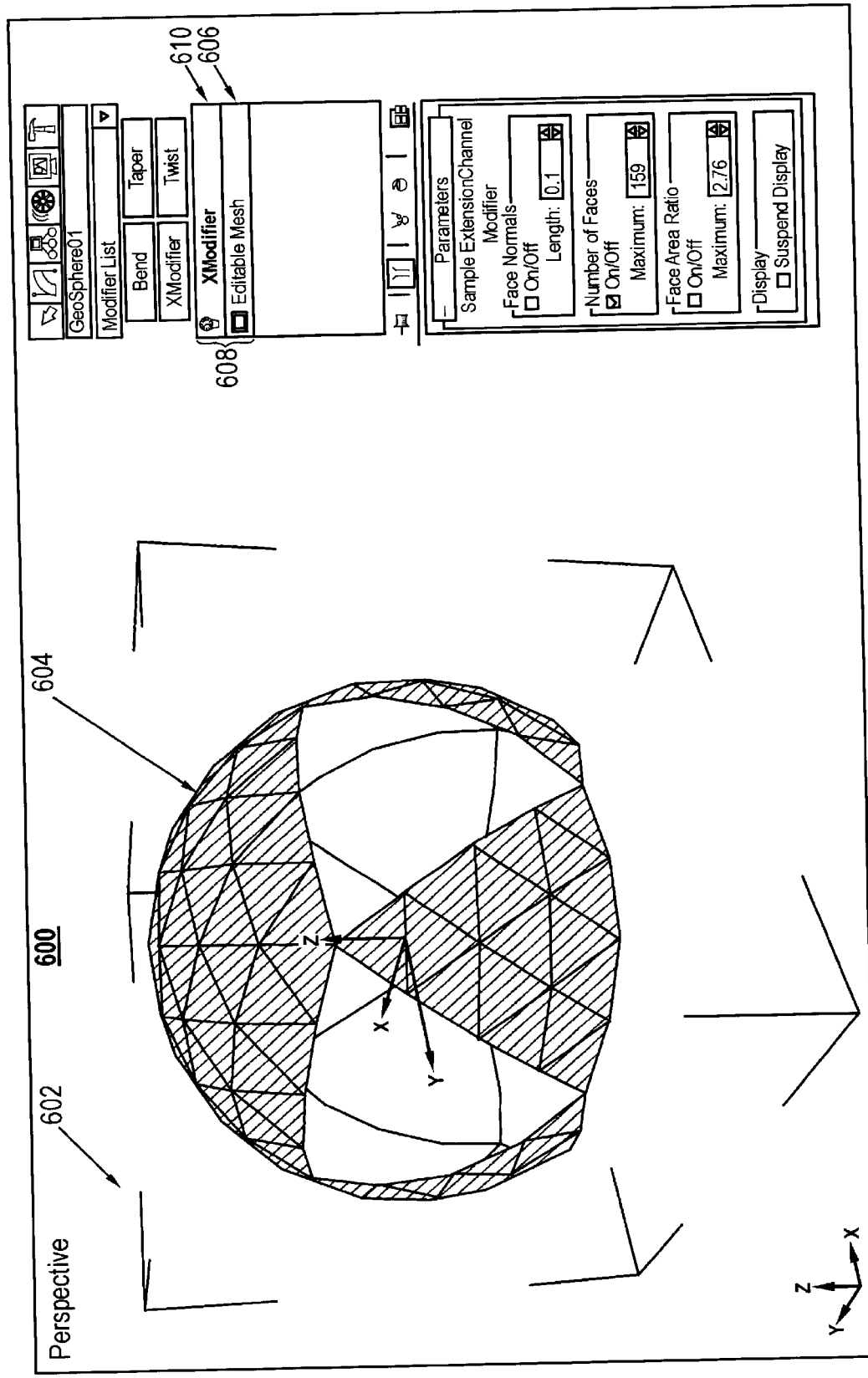
FIG. 6B depicts a modifier stack having the base object and an XModifier, according to an embodiment of the invention.

For example, as depicted in FIG. 6A, a user may interact with user interface window 600 to define a base object 606 in stack 608 to create a sphere object 604 as depicted in display window 602, according to an embodiment of the invention. Next, as depicted in FIG. 6B, the user may interact with user interface window 600 to define and insert into stack 608 an XModifier 610 that attaches an XTC object to the geometry object that will limit the number of faces in the sphere object 604 to "159", according to an embodiment of the invention. Thus, if the modifier stack is collapsed at this point with the XTC object still active, the editable geometry object that is created will only contain "159" faces as the other face information will be lost when the modifier stack is collapsed.

To address the use of extension objects when a stack is collapsed, in certain embodiments, extension objects are notified when a stack is about to be collapsed. The notification may include a pointer to the editable geometry object that results from collapsing the stack.

Figure 6C:
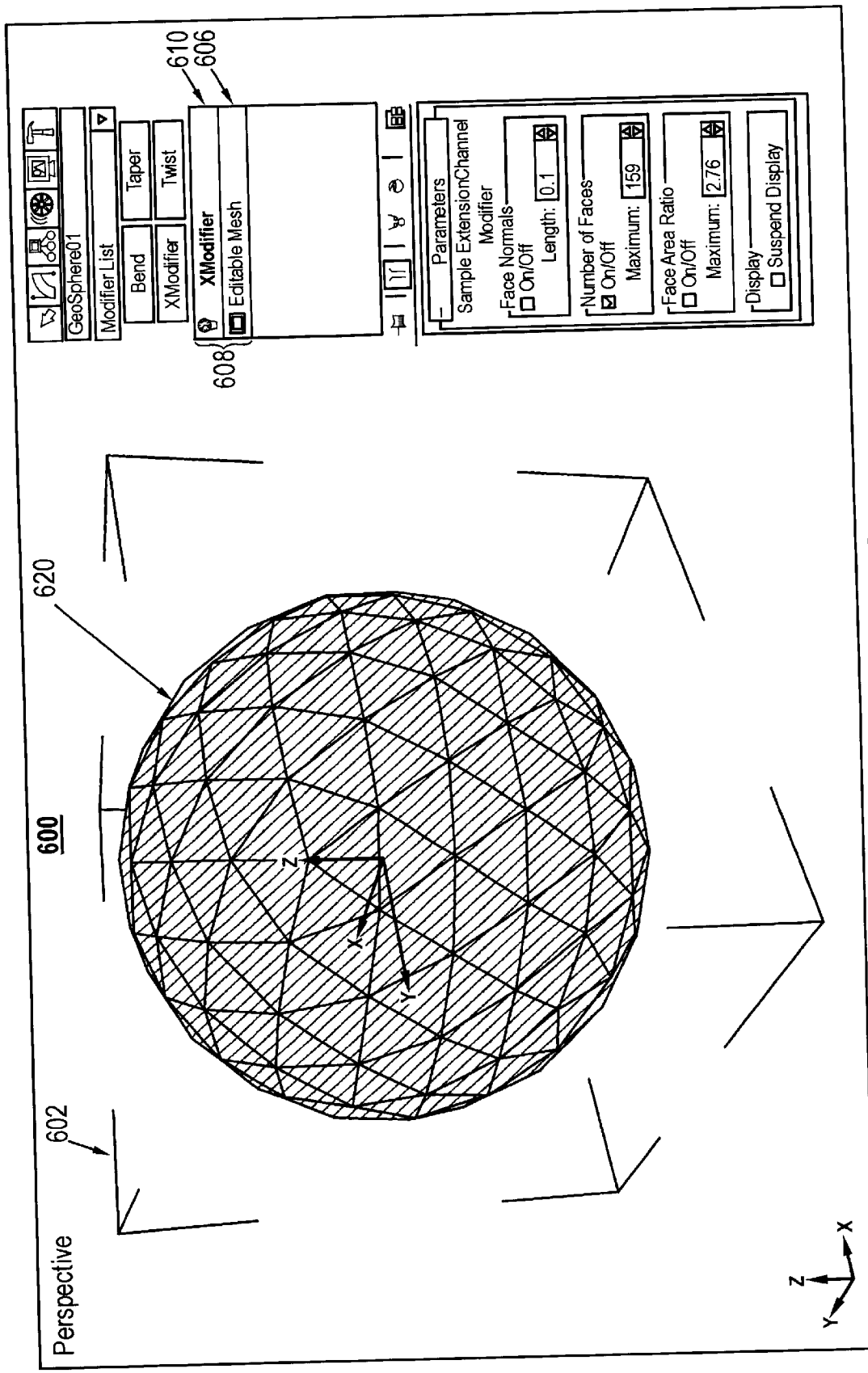
FIG. 6C depicts an editable geometry object created by collapsing the modifier stack having the base object and the XModifier, according to an embodiment of the invention.

In response to the notification, the extension object can disable itself so that the extension object does not influence the editable geometry object that is created by collapsing the stack. For example, FIG. 6C depicts an editable object 620 that was generated in response to collapsing stack 608, according to an embodiment of the invention. As depicted, although XModifier 610 had previously attached an XTC object to the geometry object, because the XTC object disabled itself prior to the collapsing of stack 608, the resulting editable object 620 includes all of its faces.

Figure 6D:
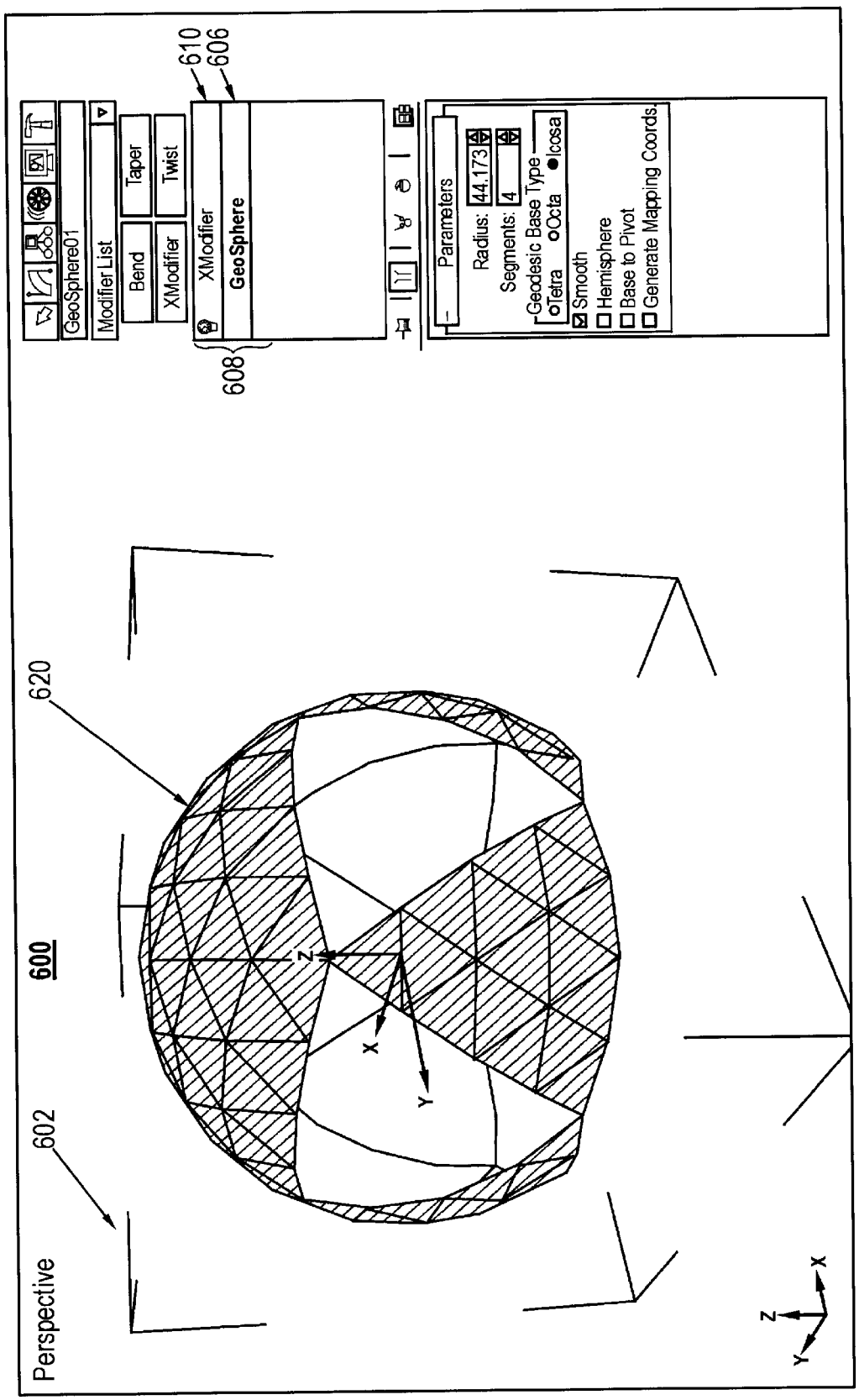
FIG. 6D depicts the editable geometry object after an extension object is notified that the modifier stack has been collapsed, according to an embodiment of the invention.

In certain embodiments, extension objects are notified after a stack has been collapsed. In response to the notification, the extension objects may re-enable themselves, such as by using a pointer contained in the pre-collapse notification, so that the extension objects can again influence the editable geometry object that is created by collapsing the stack. For example, FIG. 6D depicts an editable object 620 after the XTC object was notified that the stack 608 had been collapsed and in response re-enabled the "159" face limit, according to an embodiment of the invention.

According to one embodiment, any component, not just a component that is associated with an extension object, may use the pre-collapse and post-collapse notifications. For example, a bend modifier may subscribe to the notifications, and as a result, the bend modifier may disable itself prior to the collapsing of the modifier stack and then enable itself after the collapsing of the modifier stack.

If an extension object is created based on a base object, such as XGeoSphere 424, the pre-collapse notification is handled in the same manner as with any modifier that subscribes to the notification mechanism. However, because the result of the collapsing the modifier stack is a new, editable geometry object, the original base object no longer remains, thereby creating a potential problem for enabling the extension object after collapsing the stack.

To address this potential problem, several approaches may be employed. According to one embodiment, the extension object from the base object may specify that in response to the post-change notification, a component, such as an XModifier, be inserted into the stack. According to another embodiment, the extension object specifies that the editable geometry object be defined to include the original extension object.

Although FIGS. 6A through 6D depict an approach for collapsing a modifier stack that includes an XModifier 610 according to an embodiment of the invention, the described technique can also be applied to a stack that contains a base object that is associated with an extension object (for example, XGeoSphere 424 in FIG. 4A). For example, referring back to FIG. 4A, in certain embodiments, XGeoSphere 424 may receive pre- and post collapse notifications for the collapsing of modifier stack 214. In response to the pre-collapse notification, the XTC object of XGeoSphere 424 is disabled. Thereafter, in response to the post-collapse notification, a new XModifier is generated and inserted into the modifier stack 214 directly after the editable mesh. The new XModifier attaches a new XTC object to the modifier stack that is a copy of the original XTC object that was associated with the XGeoSphere 424.

Merging Extension Objects

In certain situations, a stack may contain multiple extension objects. For example, there may be two or more extension objects that are configured to influence a single geometry object. As another example, the stack may contain two or more branches, such as for a compound object that is comprised of two or more geometry objects that are each contained in a different branch, and two or more of the branches may have one or more extension objects.

In certain cases, the two or more extension objects may be associated with attributes that are of a different type (e.g., friction values, face size limits, face number limits, etc.). For example, one branch may include a first XTC object that requires a friction value of "10" to be associated with fifty-percent of the faces that are displayed for the geometry object while a second branch includes a second XTC object that limits the number of faces that are displayed to one hundred ("100").

In one embodiment, a user may select a particular order for which inputs from multiple extension objects of different types are to be evaluated and applied to the geometry object. For example, the user may select to first apply the XTC object that limits the number of faces that are displayed to one hundred ("100") and to secondly apply the XTC object that requires a friction value of "10" to be associated with fifty-percent of the faces applied second.

In certain cases, the two or more extension objects may be associated with attributes that are of the same type. For example, a first branch may include a first XTC object that requires a friction value of "10" to be associated with the faces of the object while a second XTC object that requires a friction value of "4" to be associated with the faces of the object.

In certain embodiments, XTC objects having attributes of the same type are merged to form a single XTC object. The single XTC object is then applied to the geometry object as the geometry object is propagated up the modifier stack. For example, the first and second XTC objects may be merged to generate a "merged" XTC object that requires a friction value of "7" (i.e., average of friction values of "10" and "4") to be associated with the faces of the object. This merged XTC object may be attached to the geometry object as the geometry object is propagated up the modifier stack to cause a friction value of "7" to be associated with the faces of the geometry object.

In certain embodiments, when two or more extension objects include a set of conflicting constraints and/or attributes, a variety of different arbitration schemes may be used to determine how the conflicts are to be resolved. For example, the arbitration scheme may average the constraints and/or attributes (i.e., apply a friction value of "7"). Alternatively, the arbitration scheme may select an XTC object as the dominant object and thus apply only the XTC object's constraints and/or attributes. In one embodiment, the user may select a specific arbitration scheme for applying to conflicting XTC object constraints and/or attributes.

In certain embodiments, although the user may override the default settings, XTC objects having similar attribute types as well as XTC objects having dissimilar attribute types, and which are associated with different branches of a modifier stack, are by default not merged into a single XTC object, but instead separately applied to the geometry object.

The following is an example of three methods that may be used to overwrite a default behavior of two XTC objects and to merge the XTC objects together into the same class.

virtual bool RemoveXTCObjectOnMergeBranches (Object *obFrom, Object *obTo);

virtual bool MergeXTCObject(Object *obFrom, Object *obTo, int prio, int branchID);

virtual bool RemoveXTCObjectOnBranchDeleted(Object *ComObj,int branchID, bool branchWillBeReordered);

Using Extension Objects With Hardware Devices
(1) Overview of Extension Objects and Hardware Shaders According to one embodiment, extension objects are used in modeling geometry objects to provide instructions to graphics devices for use by the graphics devices when rendering the geometry objects. For example, an XTC object can be associated with a geometry object in a 3D modeling application by adding an XModifier to a modifier stack. The XTC object contains information, such as (1) computer code for interfacing with an API for a hardware shader (hereinafter "interfacing code") and (2) assembly-type instructions for directing the operations performed by the hardware shader (hereinafter "device instructions"). The information is carried along by the XTC object as the modifier stack is evaluated. The output of the modifier stack is a representation of the geometry object in a particular geometry type, such as a mesh version of the geometry object, that includes the interfacing code and device instructions from the XTC object. The interfacing code is executed to send the modifier stack's output to the API of the hardware shader, which passes along the device instructions to the hardware shader. In response to executing the device instructions, the hardware shader modifies the mesh representation of the geometry object that came from the modifier stack to produce a revised representation for display.

Note that while the examples are described herein in terms of hardware shaders, the techniques described can be applied to any graphics hardware device that can perform graphical operations on a geometry object.
(2) Geometry Pipeline vs. Graphics Pipeline The use of extension objects with graphics hardware can be understood by breaking up the graphics process into a "geometry pipeline" and a "graphics pipeline." The geometry pipeline includes the stack of a modeling applications, such as a modifier stack described above. For example, the modifier stack may start with a base object and produce a modified geometry object by applying one or more modifiers to the base object. The modification of the base object may involve the use of one or more extension objects, as described above.

By evaluating the modifier stack, a representation of the geometry object is produced and sent to a node. The node may be the wscache node as described above, which translates the representation of the geometry object from object space to world space. The node also serves as the dividing point between the geometry pipeline and the graphics pipeline. The node makes a call to display the object, which is the entry point to the graphics hardware, or graphics pipeline.

For example, for a mesh object, the node can use a display method called "mesh render" that is passed to the underlying mesh for the mesh object. The mesh render display method includes a new class, such as an "XTC access pointer," to access an XTC object that was associated with the geometry object in the modifier stack and that contains information for controlling the rendering of the object by the graphics hardware. The mesh render display method can check every mesh for the presence of an extra parameter or indicator that there is an XTC object with data for the graphics hardware. If such an indicator is identified, then the render method can check the current hardware to verify that the current hardware is capable of handling the data from the XTC object. If the hardware is capable, then the pointer is passed to an underlying graphics layer that in turn invokes the interfacing code present in the XTC object for interacting with the API and that passes along the device instructions to the graphics hardware.

Figure 10:
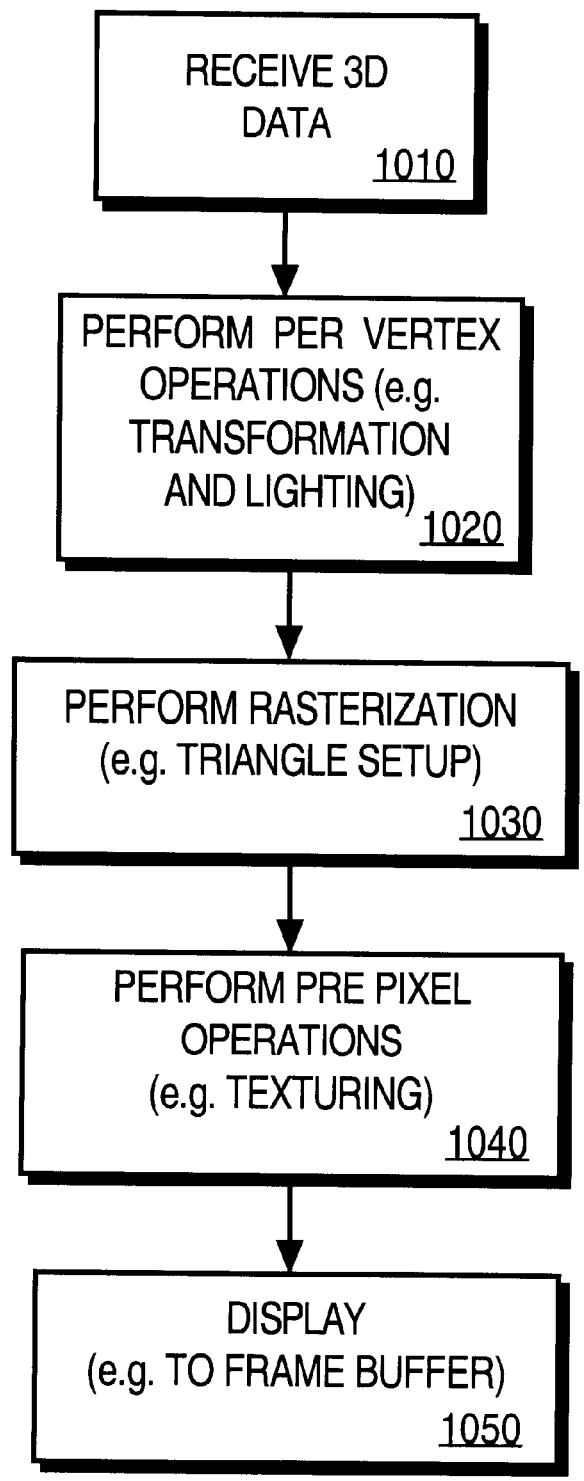
FIG. 10 depicts a flow diagram of the operation of a conventional hardware shader.

From the node, the geometry object passes to the graphics pipeline. The flow diagram depicted in FIG. 10 illustrates the actions that are typically performed in the graphics pipeline, such as per vertex operations, rasterization, per pixel operations, and display.

The 3D modeling application is used in the geometry pipeline, whereas the graphics hardware (e.g., hardware shaders and the associated API's) is used in the graphics pipeline. In the past, software had little or no control over the graphics process in the graphics pipeline. With the advent of hardware shaders and the associated API's, the user can now control the manipulation of the geometry object from the geometry pipeline, such as by using shader tools that work with the output of the 3D modeling applications or by using the extension objects as described herein to direct the operation of the graphics hardware from within the graphics modeling application.
(3) Using Extension Objects to Direct Graphics Hardware According to one embodiment, an extension object that contains information for use by graphics hardware is associated with the geometry object in a stack. For example, an XModifier can be added to a modifier stack to perform a particular graphical transformation, such as a morph. The XModifier may be configured to provide information to the graphics hardware so that the graphics software does not alter the geometry object. As an alternative, the XModifier can include a parameter to allow the user to select whether the 3D modeling application is to apply the graphical transformation or whether graphics hardware, such as a hardware shader, is to apply the graphical transformation. As yet another alternative, the XModifier may allow the user to specify that both the software and hardware are to apply the transformation.

As a result of associating the extension object that has the information for the graphics hardware with the geometry object, the information for the graphics hardware flows up the stack with the geometry object and remains associated with the geometry object while passing through the node from the geometry pipeline to the graphics pipeline.

The use of extension objects for providing data to the graphics hardware can include all of the features described above, including but not limited to, associating the extension object using a modifier or a base object, combining extension objects of the same or different types and from multiple branches, and disabling and enabling the extension objects prior to and after the collapse of a stack.

(4) Information Passed from Geometry Pipeline to Graphics Pipeline

According to one embodiment, the information passed from the geometry pipeline to the graphics pipeline using the extension object includes one or more of the following: interface code for interacting with the API for the graphics hardware, device instructions for interacting with the graphics hardware, and texturing information for use by the graphics hardware in per pixel operations. In some implementations, the information may be part of a plug-in.

For example, the interfacing code may be based on C++ code for interacting with the API via a series of calls to program the graphics pipeline. The device instructions may comprise assembler or assembler-type instructions that are passed by the API with little or no modification from the extension object to the graphics hardware. The device instructions can define the equations for one or more graphical transformations, such as a morph, along with parameters for configuring the transformations. The texturing information can specify how interpolation for determining pixel color is to be performed or one or more textures to be applied in the per pixel operations by the graphics hardware.

(5) Additional Features of Using Extension Objects With Graphics Hardware

Current graphics hardware and API's are generally limited to per vertex operations and per pixel operations. However, as capabilities of graphics hardware and API's is expanded, additional capabilities may be added, such the ability to add new faces to an object. The techniques disclosed herein can be applied to such enhanced graphics hardware in the same manner as for the per vertex and per pixel operations described herein.

Figure 11:
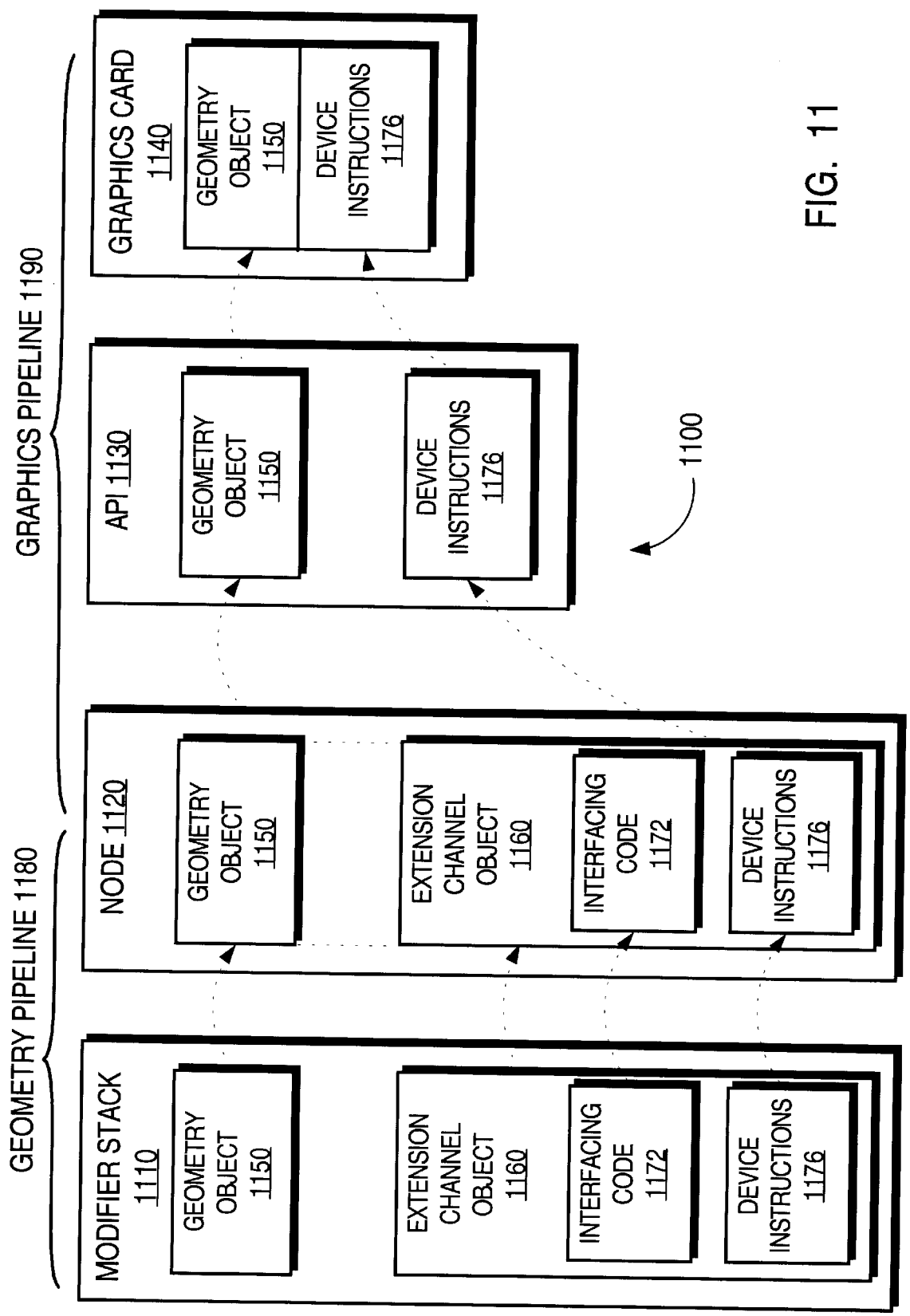
FIG. 11 depicts a logical block diagram of how an extension channel object in a modifier stack can be used to provide instructions to a graphics card, according to an embodiment of the invention.

FIG. 11 depicts a logical block diagram 1100 of how an extension channel object in a modifier stack can be used to provide instructions to a graphics card, according to an embodiment of the invention. While the example of FIG. 11 depicts specific details, such as the use of a modifier stack and a graphics card, the invention is not limited to implementations having such features, and other stacks and graphics hardware may be used.

FIG. 11 depicts a modifier stack 1110, a node 1120, an API 1130, and a graphics card 1140. Node 1120 may be implemented as a node that includes the world state cache (e.g., wscache), such as node wscache data 158 described above. Node 1120 may be used to define the where the geometry pipeline 1180 meets the graphics pipeline 1190, as described above.

Modifier stack 1110 includes a geometry object 1150 and an extension channel object 1160. Geometry object 1150 may be based on any type of base object that is modified by a series of modifiers in modifier stack 1110.

Extension channel object 1160 may be any extension object that is associated with geometry object 1150 in the modifier stack based on an extension base object, an extension modifier, or any other component that can define an extension object. For the example depicted in FIG. 11, assume that extension channel object 1160 defines a morphing operation to be performed on geometry object 1150 by graphics card 1140.

In addition to defining the morphing operation, extension channel object 1160 includes interfacing code 1172 and device instructions 1176. Interfacing code 1172 includes calls to be made to API 1130 when geometry object 1150 is passed from geometry pipeline 1180 to graphics pipeline 1190. Device instructions 1176 include instructions that define the morphing operation to be performed by graphics card 1140 when processing geometry object 1150.

In node 1120, a representation of geometry object 1150 in world space coordinates is generated based on the object space representation of geometry object 1150 from modifier stack 1110. In node 1120, extension channel object 1160 remains associated with geometry object 1150.

As geometry object 1150 passes from node 1120 to API 1130, extension channel object 1160 itself is no longer associated with geometry object 150. However, interfacing code 1172 and device instructions 1176 from extension channel object 1160 are included in the representation of geometry object 1150 that is passed to API 1130.

When node 1120 receives the representation of geometry object 150 from modifier stack 1110, calls based on interfacing code 1172 are made to API 1130 to pass along the representation of geometry object 150 and device instructions to API 1130.

When API 1130 receives the representation of geometry object 1150 and device instructions 1176 from node 1120, API 1130 may process geometry object 150 prior to sending geometry object 1150 to graphics card 1140. After the processing is complete, API 1130 sends geometry object 150 with device instructions 1176 to graphics card 1140.

When graphics card 1140 receives geometry object 1150 and device instructions 1176, graphics card 1140 uses the instructions included in device instructions 1176 to perform a graphical operation, such as the morphing operation assumed for the example depicted in FIG. 11, as part of rendering geometry object 1150 on a display. For example, for the assumed morphing operation, device instructions 1176 may include both per vertex and per pixel operations, as discussed above with reference to FIG. 10.

By using extension channel object 1160 in FIG. 11, the user can essentially program graphics card 1140 based on the modifier used to associate extension channel object 1160 with geometry object 1150 in modifier stack 1110 in a 3D graphics modeling application. As a result, the speed with which geometry object 1150 can be rendered on the display to the user can be significantly enhanced through the use of graphics card 1140 for the morphing operation instead of the 3D graphics software performing the morphing operation.

Hardware Overview

The approach for using hardware devices to generate modified geometry objects based on instructions provided by extension objects described herein may be implemented in a variety of ways and the invention is not limited to any particular implementation. The approach may be integrated into a computer system or a graphics card, or may be implemented as a stand-alone mechanism. Furthermore, the approach may be implemented in computer software, hardware, or a combination thereof.

Figure 7:
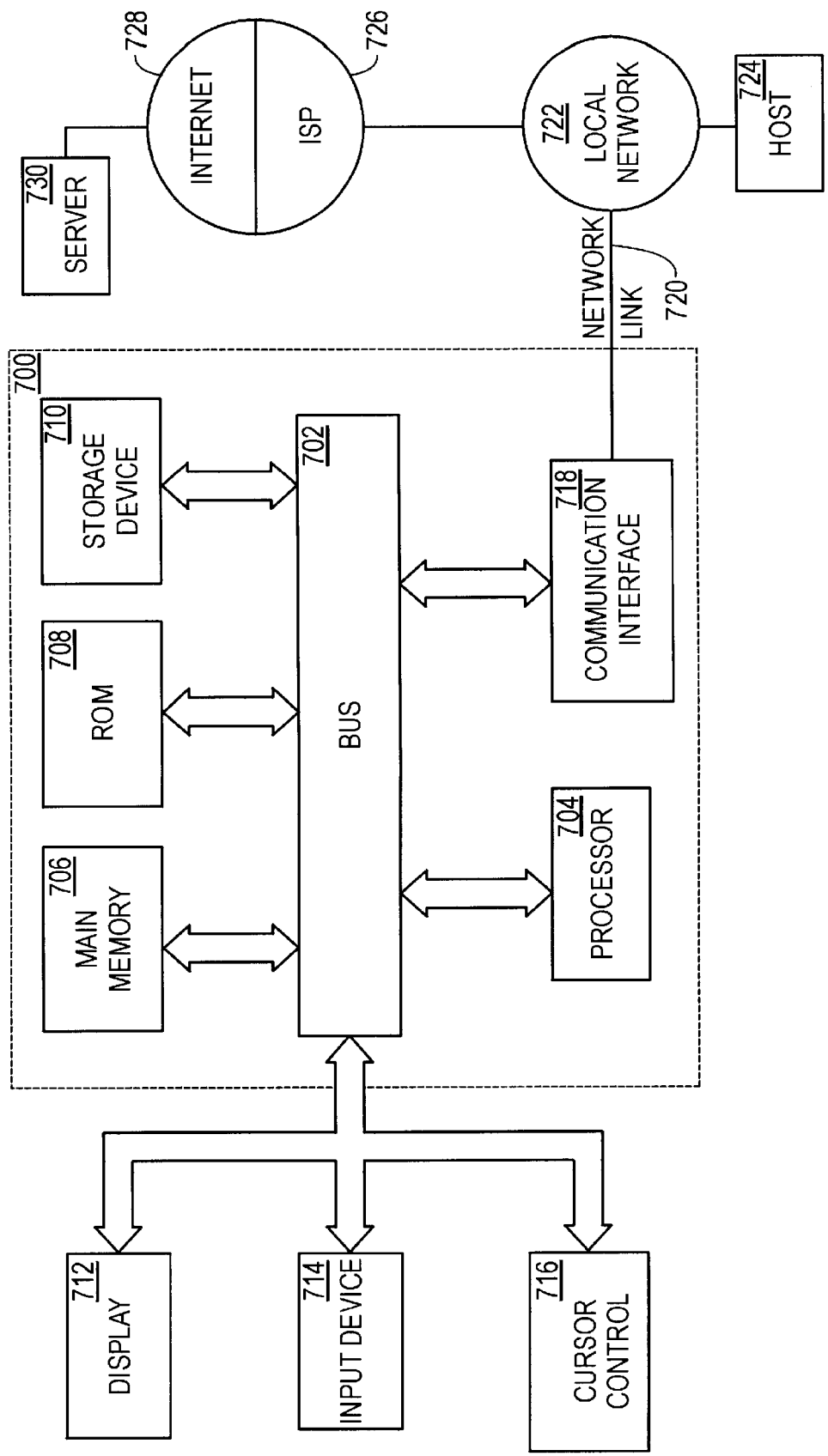
FIG. 7 is a block diagram of a computer system with which an embodiment may be carried out.

FIG. 7 is a block diagram that depicts a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for using hardware devices to generate modified geometry objects based on instructions provided by extension objects. According to one embodiment of the invention, the techniques described herein are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for implementing extension channel modifiers within a modifier stack as described herein.

The received code may be executed by processor 704 as it is received, and/or stored in storage device 710, or other non-volatile storage for later execution. In this manner, computer system 700 may obtain application code in the form of a carrier wave.

Alternatives, Extensions

An approach for using hardware devices to generate modified geometry objects based on instructions provided by extension objects has been described. In describing certain embodiments of the invention, several drawing figures have been used for explanation purposes. However, the invention is not limited to any particular context as depicted in the accompanying figures, and the scope of the invention includes other contexts and applications in which the mechanisms and processes described herein is available to other mechanisms, methods, programs, and processes. For example, although examples have illustrated the use of hardware shaders with 3D graphics modeling applications, the hardware shaders with 3D graphics modeling applications are used for explanation purposes only as embodiments of the invention are not limited to any particular type of graphics hardware and software. Thus, the specification and drawings are, accordingly, to be regarded in an illustrative rather than a restrictive sense. Therefore, the invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

EXAMPLE SET A

Copyright© 2000 Autodesk, Inc.

The following is an example of a list of class object methods that may be used by the notification mechanism while evaluating a sequence of components, such as a modifier stack.

virtual Class_ID ExtensionID( );

This method returns the unique identifier for the object.

virtual XTCObject *Clone( );

This method is called to create a cloned copy of the object. The object should create a copy of itself and return a pointer to it.

virtual ChannelMask DependsOn( );

This method returns a ChannelMask which specifies the channels that the XTCObject depends on. If a modifier changes a channel that a XTCObject depends on, its PreChanChangedNotify( ) and PostChanChangedNotify( ) methods will be called.

virtual ChannelMask ChannelsChanged( );

This method returns a ChannelMask which specifies the channels that the extension object changes in the PreChanChangedNotify( ) and PostChanChangedNotify( ) methods.

virtual ChannelMask ChannelsUsed( );

This method returns a ChannelMask which specifies the channels that the extension object uses in the PreChanChangedNotify( ) and PostChanChangedNotify( ) methods.

virtual int Display(TimeValue t, INode* inode, ViewExp *vpt, int flags,Object *pObj);

If an XTCObject wants to display itself in the viewport it can overwrite this method.

Parameters:

TimeValue t: The time at which the object is to be displayed.

INode* inode: Points to the node for the object.

ViewExp *vpt: Points to the viewport interface for the object.

int flags: See List of Display Flags.

Object *pObj: Points to the object that the extension object is a part of.

virtual void PreChanChangedNotify(TimeValue t, ModContext &mc, ObjectState* os, INode *node, Modifier *mod, bool bEndOfPipeline);

This method is called before a modifier is applied that changes a channel that the XTCObject depends on.

Parameters:

TimeValue t: The time at which the channel will be modified.

ModContext &mc: The modifier context.

ObjectState* os: The objectstate of the object.

INode *node: A pointer to the node.

Modifier *mod: A pointer to the modifier being applied.

bool bEndOfPipeline: TRUE to indicate that this is the last change before the wsCache.

virtual void PostChanChangedNotify(TimeValue t, ModContext &mc, ObjectState* os, INode *node,Modifier *mod, bool bEndOfPipeline);

This method will be called after a modifier is applied that changes a channel that the XTC object depends on.

Parameters:

TimeValue t: The time at which the channel will be modified.

ModContext &mc: The modifier context.

ObjectState* os: The objectstate of the object.

INode *node: A pointer to the node.

Modifier *mod: A pointer to the modifier being applied.

bool bEndOfPipeline: TRUE to indicate that this is the last change before the wsCache.

virtual BOOL SuspendObjectDisplay( );

If the XTCObject returns TRUE from this method the object is not displayed in the viewport; if FALSE is returned the Display( ) method will be called to display the object.

virtual void DeleteThis( );

This method is called to delete the extension object.

virtual void MaybeEnlargeViewportRect (GraphicsWindow *gw, Rect &rect);

This method allows the object to enlarge its viewport rectangle if it wants to. The system will call this method for all XTCObjects when calculating the viewport rectangle; the XTCObject can enlarge the rectangle if desired.

Parameters:

GraphicsWindow *gw: Points to the GraphicsWindow instance associated with the viewport the object is displayed in.

Rect &rect: The viewport rectangle for the object which may be modified.

virtual bool RemoveXTCObjectOnMergeBranches (Object *obFrom, Object *obTo);

By default the existing XTCObjects will be deleted if a branch updates In case the XTCObject wants to do more intelligent branching (not simply delete and add), it can return false from this method so that it can later (see MergeXTCObject( ) below) copy the data from this and other branches into an existing XTCObject.

Parameters:

Object *obFrom: Points to the source object.

Object *obTo: Points to the destination object.

Return Value:

Returns true if the object will be deleted; false to do more processing via MergeXTCObject.

Default Implementation:

{return true;} virtual bool MergeXTCObject(Object *obFrom, Object *obTo, int prio, int branchID);

The default implementation just adds the XTCObject to the to object. In case the XTCObject should do a more intelligent merge with already existing XTCObjects in the obTo, it has to overwrite this method.

Parameters:

Object *obFrom: Points to the source object.

Object *obTo: Points to the destination object.

int prio : The priority to set.

int branched: The branch identifier to set.

Return Value:

TRUE if successful, otherwise FALSE.

Default Implementation:

{obTo->AddXTCObject(this,prio,branchID); return true;} virtual bool RemoveXTCObjectOnBranchDeleted(Object *ComObj,int branchID, bool branchWillBeReordered);

In case a branch of a compound object is deleted the XTCObject will be asked if the XTCObject should be deleted as well. In case the XTCObject represents a merge of all branches the XTCObject might want to return false to this method and reassign itself to another branch, so that the merged information is not lost.

Parameters:

Object *ComObj: A pointer to the compound object.

int branched: The branch identifier to set.

bool branchWillBeReordered: TRUE if the branch should be reordered, otherwise FALSE.

Return Value:

TRUE if successful, otherwise FALSE.

Default Implementation:

{return true;}

What is claimed is:

1. A method for generating a modified geometry object, the method comprising the computer-implemented steps of:

producing a first result by sequentially applying to a geometry object one or more components in an ordered sequence of components;

producing a second result by applying to the first result at least one component that follows the one or more components in the ordered sequence;

associating an extension object with a position in the ordered sequence that precedes said at least one component, wherein the extension object is associated with second data; and after the step of producing the second result, modifying data that does not affect how the geometry object appears when rendered, based on the extension object.

2. The method of claim 1, wherein the step of modifying data that does not affect how the geometry object appears when rendered is performed by modifying data that is associated with the geometry object and that does not affect how the object appears when rendered.

3. The method of claim 1, wherein the step of modifying data that does not affect how the geometry object appears when rendered is performed by modifying data that is associated with the extension object and that does not affect how the object appears when rendered.

4. The method of claim 1, further comprising the computer-implemented step of:

based on the extension object, modifying the second result.

5. A method for generating base components using two ordered sequences of components, the method comprising the computer-implemented steps of:

generating a first geometry object based on a first ordered sequence of components that includes a first base component and a plurality of other components, wherein the plurality of other components includes one or more components that are disabled;

generating a second base component based on the first base component and all components of the plurality of components other than the one or more components that are disabled; and associating the second base component with a second plurality of components to form a second ordered sequence of components.

6. The method of claim 5, further comprising the computer-implemented step of:

in response to a notification that is made before generating the second base component, disabling the one or more components.

7. The method of claim 5, wherein the second ordered sequence of components includes the one or more components that were disabled in the first ordered sequence of components.

8. The method of claim 7, further comprising the computer-implemented step of:

in response to a notification that is made after generating the second base component, adding the one or more components to the second ordered sequence of components, wherein the one or more components are not disabled in the second ordered sequence of components.

9. The method of claim 5, wherein the one or more components that are disabled include a component that is associated with an extension object.

10. The method of claim 5, wherein the one or more components that are disabled include a component that is not associated with an extension object.

11. A method for transferring components between ordered sequences of components, the method comprising the computer-implemented steps of:

generating a first geometry object based on a first ordered sequence of components that includes a first base component and a first extension component that is associated with an extension object;

generating a second base component based on the first ordered sequence of components;

generating a second ordered sequence of components that includes the second base component; and based on the extension object, associating the extension object with the second ordered sequence of components.

12. The method of claim 11, wherein the step of associating the extension object with the second ordered sequence of components is performed by including a second extension component in the second ordered sequence of components, wherein the second extension component is associated with the extension object.

13. The method of claim 11, wherein the step of generating the second base component is performed by generating an extension base component based on the first ordered sequence of components and the extension object.

14. A method for generating a first geometry object that is associated with a first ordered sequence of components that includes a first extension component, the method comprising the computer-implemented steps of:

generating a second geometry object based on a second ordered sequence of components that includes a second extension component that is associated with an extension object;

generating a third geometry object based on a third ordered sequence of components;

generating the first geometry object based on the second geometry object and the third geometry object; and generating the first ordered sequence of components based on the first ordered sequence of components and the second ordered sequence of components, wherein the first extension component that is included in the first ordered sequence of components is based on the second extension component.

15. The method of claim 14, wherein the third ordered sequence of components includes a third extension component that is associated with an additional extension object, and wherein the step of generating the first ordered sequence of components includes the computer-implemented step of:

generating the first ordered sequence of components based on the first ordered sequence of components and the second ordered sequence of components, wherein the first extension component that is included in the first ordered sequence of components is based on the second extension component and the third extension component.

16. The method of claim 14, wherein the third ordered sequence of components includes a third extension component that is associated with an additional extension object, wherein the first ordered sequence of components includes a fourth extension component, and wherein the step of generating the first ordered sequence of components includes the computer-implemented step of:

generating the first ordered sequence of components based on the first ordered sequence of components and the second ordered sequence of components, wherein the first extension component that is included in the first ordered sequence of components is based on the second extension component and wherein the fourth extension component that is included in the first ordered sequence of components is based on the third extension component.

17. A method for generating a modified geometry object based on repeating an operation that is associated with an extension object, the method comprising the computer-implemented steps of:

applying an ordered sequence of components to a geometry object, wherein at least one component of the ordered sequence specifies how to modify a first result that is produced based on one or more previous components in the ordered sequence;

producing a second result by applying to the first result a first component;

after applying the first component, producing a third result based on the second result and the operation that is associated with the extension object; and repeatedly modifying the third result based on the operation that is associated with the extension object until a condition is satisfied.

18. A method for generating a modified geometry object, the method comprising the computer-implemented steps of:

associating an extension object with a sequence of components upon which modifications to a geometry object are based;

generating a first representation of the geometry object based on the sequence of components;

associating code with the first representation of the geometry object, wherein the code is based on the extension object; and using a graphics device to generate a second representation of the geometry object based on the first representation and the code.

19. The method of claim 18, wherein:

the method further comprises the computer-implemented step of obtaining the code from the extension object; and the step of using comprises the computer-implemented step of executing the code to provide instructions to the graphics device for generating the second representation of the geometry object based on the first representation.

20. The method of claim 18, wherein:

the method further comprises the computer-implemented step of generating the code based on the extension object; and the step of using comprises the computer-implemented step of providing the code to the graphics device, wherein the graphics device executes the code to generate the second representation of the geometry object based on the first representation.

21. The method of claim 20, wherein the graphics device executes the code to perform vertex operations on the geometry object to generate the second representation.

22. The method of claim 20, wherein the graphics device executes the code to perform pixel operations on the geometry object to generate the second representation.

23. The method of claim 18, wherein the graphics device includes a hardware shader.

24. The method of claim 18, wherein the graphics device includes a vertex shader and a pixel shader.

25. The method of claim 18, wherein the graphics device includes an application program interface based on DirectX.

26. The method of claim 18, wherein the graphics device includes an application program interface based on OpenGL.

27. The method of claim 18, wherein the sequence of components is a stack.

28. The method of claim 27, wherein the stack is a modifier stack.

29. The method of claim 18, wherein:

the code includes a first set of instructions and a second set of instructions;

the graphics device includes an application program interface and a graphics card;

the method further comprises the computer-implemented step of, based on the extension object, generating the second set of instructions for performing at least one modification of the geometry object; and the step of using comprises the computer-implemented steps of:

executing the first set of instructions to cause the application program interface to provide the first representation and the second set of instructions to the graphics card; and causing the graphics card to execute the second set of instructions to modify the first representation of the geometry object to generate the second representation.

30. The method of claim 29, wherein the first set of instructions is interfacing code and the second set of instructions are device instructions.

31. The method of claim 18, wherein:

the step of associating comprises the computer-implemented step of associating the extension object with a position in the sequence of components upon which modifications to the geometry object are based; and the method further comprises the computer-implemented step of associating the code with the geometry object, wherein the code remains associated with the geometry object as one or more components that follow the position are applied to the geometry object.

32. A computer-readable medium carrying one or more sequences of instructions for generating a modified geometry object, wherein execution of the one or more sequences of instructions by one or more processors causes the one or more processors to perform the steps of:

producing a first result by sequentially applying to a geometry object one or more components in an ordered sequence of components;

producing a second result by applying to the first result at least one component that follows the one or more components in the ordered sequence;

associating an extension object with a position in the ordered sequence that precedes said at least one component, wherein the extension object is associated with second data; and after the step of producing the second result, modifying data that does not affect how the geometry object appears when rendered, based on the extension object.

33. The computer-readable medium of claim 32, wherein the instructions for modifying data that does not affect how the geometry object appears when rendered further comprise instructions which, when executed by the one or more processors, cause the one or more processors to carry out the step of:

modifying data that is associated with the geometry object and that does not affect how the object appears when rendered.

34. The computer-readable medium of claim 32, wherein the instructions for modifying data that does not affect how the geometry object appears when rendered further comprise instructions which, when executed by the one or more processors, cause the one or more processors to carry out the step of:

modifying data that is associated with the extension object and that does not affect how the object appears when rendered.

35. The computer-readable medium of claim 32, further comprising instructions which, when executed by the one or more processors, cause the one or more processors to carry out the step of:

based on the extension object, modifying the second result.

36. A computer-readable medium carrying one or more sequences of instructions for generating base components using two ordered sequences of components, wherein execution of the one or more sequences of instructions by one or more processors causes the one or more processors to perform the steps of:

generating a first geometry object based on a first ordered sequence of components that includes a first base component and a plurality of other components, wherein the plurality of other components includes one or more components that are disabled;

generating a second base component based on the first base component and all components of the plurality of components other than the one or more components that are disabled; and associating the second base component with a second plurality of components to form a second ordered sequence of components.

37. The computer-readable medium of claim 36, further comprising instructions which, when executed by the one or more processors, cause the one or more processors to carry out the steps of:

in response to a notification that is made before generating the second base component, disabling the one or more components.

38. The computer-readable medium of claim 36, wherein the second ordered sequence of components includes the one or more components that were disabled in the first ordered sequence of components.

39. The computer-readable medium of claim 38, further comprising instructions which, when executed by the one or more processors, cause the one or more processors to carry out the step of:

in response to a notification that is made after generating the second base component, adding the one or more components to the second ordered sequence of components, wherein the one or more components are not disabled in the second ordered sequence of components.

40. The computer-readable medium of claim 36, wherein the one or more components that are disabled include a component that is associated with an extension object.

41. The computer-readable medium of claim 36, wherein the one or more components that are disabled include a component that is not associated with an extension object.

42. A computer-readable medium carrying one or more sequences of instructions for transferring components between ordered sequences of components, wherein execution of the one or more sequences of instructions by one or more processors causes the one or more processors to perform the steps of:

generating a first geometry object based on a first ordered sequence of components that includes a first base component and a first extension component that is associated with an extension object;

generating a second base component based on the first ordered sequence of components;

generating a second ordered sequence of components that includes the second base component; and based on the extension object, associating the extension object with the second ordered sequence of components.

43. The computer-readable medium of claim 42, wherein the instructions for associating the extension object with the second ordered sequence of components further comprise instructions which, when executed by the one or more processors, cause the one or more processors to carry out the steps of:

including a second extension component in the second ordered sequence of components, wherein the second extension component is associated with the extension object.

44. The computer-readable medium of claim 42, wherein the instructions for generating the second base component further comprise instructions which, when executed by the one or more processors, cause the one or more processors to carry out the steps of:

generating an extension base component based on the first ordered sequence of components and the extension object.

45. A computer-readable medium carrying one or more sequences of instructions for generating a first geometry object that is associated with a first ordered sequence of components that includes a first extension component, wherein execution of the one or more sequences of instructions by one or more processors causes the one or more processors to perform the steps of:

generating a second geometry object based on a second ordered sequence of components that includes a second extension component that is associated with an extension object;

generating a third geometry object based on a third ordered sequence of components;

generating the first geometry object based on the second geometry object and the third geometry object; and generating the first ordered sequence of components based on the first ordered sequence of components and the second ordered sequence of components, wherein the first extension component that is included in the first ordered sequence of components is based on the second extension component.

46. The computer-readable medium of claim 45, wherein the third ordered sequence of components includes a third extension component that is associated with an additional extension object, and wherein the instructions for generating the first ordered sequence of components further comprise instructions which, when executed by the one or more processors, cause the one or more processors to carry out the step of:

generating the first ordered sequence of components based on the first ordered sequence of components and the second ordered sequence of components, wherein the first extension component that is included in the first ordered sequence of components is based on the second extension component and the third extension component.

47. The computer-readable medium of claim 45, wherein the third ordered sequence of components includes a third extension component that is associated with an additional extension object, wherein the first ordered sequence of components includes a fourth extension component, and wherein the instructions for generating the first ordered sequence of components further comprise instructions which, when executed by the one or more processors, cause the one or more processors to carry out the step of:

generating the first ordered sequence of components based on the first ordered sequence of components and the second ordered sequence of components, wherein the first extension component that is included in the first ordered sequence of components is based on the second extension component and wherein the fourth extension component that is included in the first ordered sequence of components is based on the third extension component.

48. A computer-readable medium carrying one or more sequences of instructions for generating a modified geometry object based on repeating an operation that is associated with an extension object, wherein execution of the one or more sequences of instructions by one or more processors causes the one or more processors to perform the steps of:

applying an ordered sequence of components to a geometry object, wherein at least one component of the ordered sequence specifies how to modify a first result that is produced based on one or more previous components in the ordered sequence;

producing a second result by applying to the first result a first component;

after applying the first component, producing a third result based on the second result and the operation that is associated with the extension object; and repeatedly modifying the third result based on the operation that is associated with the extension object until a condition is satisfied.

49. A computer-readable medium carrying one or more sequences of instructions for generating a modified geometry object, wherein execution of the one or more sequences of instructions by one or more processors causes the one or more processors to perform the steps of:

associating an extension object with a sequence of components upon which modifications to a geometry object are based;

generating a first representation of the geometry object based on the sequence of components;

associating code with the first representation of the geometry object, wherein the code is based on the extension object; and using a graphics device to generate a second representation of the geometry object based on the first representation and the code.

50. The computer-readable medium of claim 49, wherein:

the computer-readable medium further comprises instructions which, when executed by the one or more processors, cause the one or more processors to carry out the step of obtaining the code from the extension object; and the instructions for using further comprise instructions which, when executed by the one or more processors, cause the one or more processors to carry out the step of executing the code to provide instructions to the graphics device for generating the second representation of the geometry object based on the first representation.

51. The computer-readable medium of claim 49, wherein:

the computer-readable medium further comprises instructions which, when executed by the one or more processors, cause the one or more processors to carry out the step of generating the code based on the extension object; and the instructions for using further comprise instructions which, when executed by the one or more processors, cause the one or more processors to carry out the step of providing the code to the graphics device, wherein the graphics device executes the code to generate the second representation of the geometry object based on the first representation.

52. The computer-readable medium of claim 51, wherein the graphics device executes the code to perform vertex operations on the geometry object to generate the second representation.

53. The computer-readable medium of claim 51, wherein the graphics device executes the code to perform pixel operations on the geometry object to generate the second representation.

54. The computer-readable medium of claim 49, wherein the graphics device includes a hardware shader.

55. The computer-readable medium of claim 49, wherein the graphics device includes a vertex shader and a pixel shader.

56. The computer-readable medium of claim 49, wherein the graphics device includes an application program interface based on DirectX.

57. The computer-readable medium of claim 49, wherein the graphics device includes an application program interface based on OpenGL.

58. The computer-readable medium of claim 49, wherein the sequence of components is a stack.

59. The computer-readable medium of claim 58, wherein the stack is a modifier stack.

60. The computer-readable medium of claim 49, wherein:

the code includes a first set of instructions and a second set of instructions;

the graphics device includes an application program interface and a graphics card;

the computer-readable medium further comprises instructions which, when executed by the one or more processors, cause the one or more processors to carry out the step of, based on the extension object, generating the second set of instructions for performing at least one modification of the geometry object; and the instructions for using further comprise instructions which, when executed by the one or more processors, cause the one or more processors to carry out the steps of:

executing the first set of instructions to cause the application program interface to provide the first representation and the second set of instructions to the graphics card; and causing the graphics card to execute the second set of instructions to modify the first representation of the geometry object to generate the second representation.

61. The computer-readable medium of claim 60, wherein the first set of instructions is interfacing code and the second set of instructions are device instructions.

62. The computer-readable medium of claim 49, wherein:

the instructions for associating further comprise instructions which, when executed by the one or more processors, cause the one or more processors to carry out the step of associating the extension object with a position in the sequence of components upon which modifications to the geometry object are based; and the computer-readable medium further comprises instructions which, when executed by the one or more processors, cause the one or more processors to carry out the step of associating the code with the geometry object, wherein the code remains associated with the geometry object as one or more components that follow the position are applied to the geometry object.

* * * * *